United States Patent
Zhu

(10) Patent No.: US 12,069,654 B2
(45) Date of Patent: Aug. 20, 2024

(54) METHOD FOR TRANSMITTING UPLINK INFORMATION, APPARATUS BASE STATION AND TERMINAL

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 574 days.

(21) Appl. No.: 17/414,313

(22) PCT Filed: Dec. 20, 2018

(86) PCT No.: PCT/CN2018/122416
§ 371 (c)(1),
(2) Date: Jun. 15, 2021

(87) PCT Pub. No.: WO2020/124499
PCT Pub. Date: Jun. 25, 2020

(65) Prior Publication Data
US 2022/0078824 A1  Mar. 10, 2022

(51) Int. Cl.
*H04W 72/1273* (2023.01)
*H04W 24/08* (2009.01)
(Continued)

(52) U.S. Cl.
CPC ....... *H04W 72/1273* (2013.01); *H04W 24/08* (2013.01); *H04W 72/0446* (2013.01); *H04W 72/21* (2023.01)

(58) Field of Classification Search
CPC . H04W 72/1273; H04W 72/21; H04W 24/08; H04W 72/0446
See application file for complete search history.

(56) References Cited

U.S. PATENT DOCUMENTS

2009/0040976 A1* 2/2009 Kim ............... H04L 1/1812
455/73
2019/0342915 A1  11/2019 Kim et al.
(Continued)

FOREIGN PATENT DOCUMENTS

| CN | 104540230 A | 4/2015 |
| CN | 105578573 A | 5/2016 |

(Continued)

OTHER PUBLICATIONS

Panasonic, "Potential HARQ enhancements for NR-U", Nov. 2018, 3GPP TSG RAN WG1 Meeting #95, R1-1812898 (Year: 2018).*
(Continued)

*Primary Examiner* — Siming Liu
(74) *Attorney, Agent, or Firm* — Arch & Lake LLP

(57) ABSTRACT

Provided are a method for transmitting uplink information, an apparatus, a base station and a terminal. The method is applied in a base station and includes: determining uplink transmission configuration information for target uplink information, where the uplink transmission configuration information being used for notifying a terminal of how to transmit the target uplink information by using unauthorized frequency band resources; and sending the uplink transmission configuration information to the terminal so that the terminal transmits the target uplink information by using the unauthorized frequency band resources according to the uplink transmission configuration information.

19 Claims, 26 Drawing Sheets

(51) Int. Cl.
*H04W 72/0446* (2023.01)
*H04W 72/21* (2023.01)

(56) References Cited

U.S. PATENT DOCUMENTS

| | | |
|---|---|---|
| 2020/0008241 A1 | 1/2020 | Zhou |
| 2021/0092768 A1 | 3/2021 | Kim et al. |

FOREIGN PATENT DOCUMENTS

| | | | |
|---|---|---|---|
| CN | 107182126 A | 9/2017 | |
| CN | 107231688 A | 10/2017 | |
| CN | 108282879 A | 7/2018 | |
| CN | 108886788 A | 11/2018 | |
| CN | 108886789 A | 11/2018 | |
| EP | 3407659 A1 * | 11/2018 | ........... H04L 5/0053 |
| EP | 3407659 A1 | 11/2018 | |
| EP | 3451767 A1 | 3/2019 | |
| WO | 2017015903 A1 | 2/2017 | |
| WO | 2017133443 A1 | 8/2017 | |
| WO | 2017185998 A1 | 11/2017 | |

OTHER PUBLICATIONS

International Search Report of PCT Application No. PCT/CN2018/122416 dated Aug. 27, 2019 with English translation (4p).
Samsung, "Impacts on NR SA Due to Unlicensed Operation", 3GPP TSG-RAN WG2 Meeting#102 R2-1807648, Busan Korea, May 21-25, 2018, (4p).
3GPP TSG RAN WG1 #85 R1-164752, Nanjing, China, May 23-27, 2016, Agenda item: 6.2.1.5, Source: Samsung, Title: Discussion on shared MCOT and LBT procedure, Document for: Discussion and Decision, (4p).
3GPP TSG RAN WG1 meeting #85 R1-164503, Nanjing, China, May 23-27, 2016, Agenda Item: 6.2.1.5, Source: LG Electronics, Title: Further details on channel access in LAA UL, Document for: Decision, (8p).
3GPP TSG RAN WG1 Meeting #95 R1-1812898, Spokane, US, Nov. 12-16, 2018, Source: Panasonic, Title: Potential HARQ enhancements for NR-U, Agenda Item: 7.2.2.4.3, Document for: Discussion and decision, (5p).
Extended European Search Report in the European Application No. 18943572.0, mailed on Jun. 14, 2022, (13p).
3GPP TSG RAN WG1 Meeting #94 R1-1808545, Gothenburg, Sweden, Aug. 20-24, 2018, Agenda Item: 7.2.2.4.3, Source: Lenovo, Motorola Mobility, Title: HARQ-ACK enhancement for NR-U, Document for: Discussion, (3p).
Notice of Allowance of the Chinese Application No. 201880003017.9, issued on Jul. 4, 2022, (6p).
English translation of the Written Opinion of the International Search Authority in the international application No. PCT/CN2018/122416, mailed on Aug. 27, 2019, (3p).
3GPP TSG RAN WG1 Meeting #94bis R1-1810444, Chengdu, China, Oct. 8-12, 2018, Agenda Item: 7.2.2.4.3, Source: MediaTek Inc., Title: Enhancements on HARQ for NR-U operation, Document for: Discussion and Decision, (6p).
3GPP TSG RAN WG1 Meeting #94 R1-1808509, Gothenburg, Sweden, Aug. 20-24, 2018, Agenda Item: 7.2.2.4.3, Source: LG Electronics, Title: HARQ procedure for NR unlicensed operation, Document for: Discussion and decision, (5p).

* cited by examiner

METHOD FOR TRANSMITTING UPLINK INFORMATION, APPARATUS BASE STATION AND TERMINAL

CROSS-REFERENCE TO RELATED APPLICATION

This application is the US national phase application of International Application No. PCT/CN2018/122416, filed on Dec. 20, 2018, the entire contents of which are incorporated herein by reference for all purposes.

TECHNICAL FIELD

The disclosure relates to the technical field of communications, and more particularly, to a method and apparatus for transmitting uplink information, a base station and a terminal.

BACKGROUND

While mobile communication networks are gradually evolving to 5th-Generation (5G) New Radio (NR) systems, many new frequency resources are developed by mobile communication systems for information transmission. One feature of the new mobile communication system such as the 5G NR is the use of a high frequency spectrum. Another feature of the new spectrum developed by the new mobile communication system is the massive use of an unlicensed spectrum such as 2.4 GHz and 5 GHz for information transmission.

When a base station and a terminal work in the unlicensed spectrum, as both need to compete for unlicensed spectrum resources with other systems such as the Wireless Fidelity (WiFi) system, in order to ensure that both coexist with other systems on the unlicensed spectrum, and different communication systems working on the unlicensed spectrum may occupy channels fairly, the base station and the terminal also need to follow a channel detection mechanism such as the Listen Before Talk (LBT) detection mechanism used by the WiFi system. Regarding the channel detection mechanism, in the wireless communication systems, when an information sending terminal needs to transmit information to an information receiving terminal with the unlicensed spectrum resource, idle channel detection is first performed at the unlicensed spectrum, so as to determine whether an available resource exists at present.

In a related art, after the information sending terminal such as the base station detects an idle channel, it may occupy a channel resource for preset time duration according to system agreements for information transmission. During this period of time, the base station may schedule uplink and downlink transmission of a service terminal. Within each channel occupancy time duration, there may be multiple times of uplink and downlink handover transmission, to support data transmission of a service with a low latency requirement such as the Ultra Reliable Low Latency Communication (URLLC) service. As each channel occupancy time duration on the unlicensed spectrum is limited, it is possible that some to-be-transmitted uplink information is not transmitted timely at the end of the channel occupancy time duration. For example, in a possible case, after the base station transmits downlink data, the terminal does not timely feed back a Hybrid Automatic Repeat reQuest (HARQ) feedback information for the downlink data within the channel occupancy time duration at this time, which affects the support of the terminal on a latency sensitive service.

SUMMARY

In order to overcome the problems in the related art, the embodiments of the disclosure provide a method and apparatus for transmitting uplink information, a base station and a terminal, which may reduce a transmission latency of the uplink information due to an uncertainty of an unlicensed spectrum resource.

According to a first aspect of the embodiments of the disclosure, a method for transmitting uplink information is provided. The method includes that a base station determines uplink transmission configuration information for target uplink information, where the uplink transmission configuration information is used to notify a terminal of transmitting the target uplink information with an unlicensed spectrum resource.

Further, the base station sends the uplink transmission configuration information to the terminal, such that the terminal transmits the target uplink information with the unlicensed spectrum resource according to the uplink transmission configuration information.

According to a second aspect of the embodiments of the disclosure, a method for transmitting uplink information is provided. The method includes that a terminal acquires uplink transmission configuration information sent by a base station, where the uplink transmission configuration information is used to notify the terminal of how to transmit target uplink information with an unlicensed spectrum resource.

Further, the terminal determines a target uplink transmission resource according to the uplink transmission configuration information, where the target uplink transmission resource is an unlicensed spectrum resource used for carrying transmission of the target uplink information.

Moreover, the terminal sends the target uplink information to the base station with the target uplink transmission resource.

According to a third aspect of the embodiments of the disclosure, a base station is provided, which may include:
 a processor: and
 a memory, configured to store an instruction executable for the processor.
The processor is configured to:
 determine uplink transmission configuration information for target uplink information, where the uplink transmission configuration information is used to notify a terminal of how to transmit the target uplink information with an unlicensed spectrum resource: and
 send the uplink transmission configuration information to the terminal, such that the terminal transmits the target uplink information with the unlicensed spectrum resource according to the uplink transmission configuration information.

According to a fourth aspect of the embodiments of the disclosure, a terminal is provided, which may include:
 a processor; and
 a memory, configured to store an instruction executable for the processor.
The processor is configured to:
 acquire uplink transmission configuration information sent by a base station, where the uplink transmission configuration information is used to notify the terminal of how to transmit target uplink information with an unlicensed spectrum resource;

determine a target uplink transmission resource according to the uplink transmission configuration information, where the target uplink transmission resource is an unlicensed spectrum resource used for carrying transmission of the target uplink information; and send the target uplink information to the base station with the target uplink transmission resource.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
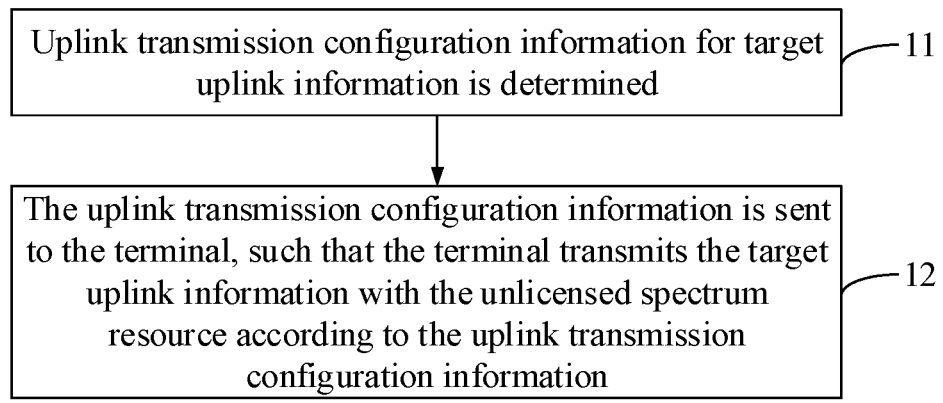
FIG. 1 is a flow chart showing a method for transmitting uplink information according to an exemplary embodiment of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used in the disclosure are only adopted for the purpose of describing specific embodiments and not intended to limit the disclosure. "A/an", "said" and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

It is to be understood that, although terms first, second, third and the like may be adopted to describe various information in the disclosure, the information should not be limited to these terms. These terms are only adopted to distinguish the information of the same type. For example, without departing from the scope of the disclosure, first information may also be called second information and, and similarly, second information may also be called first information. For example, the term "if" used here may be explained as "while" or "when" or "responsive to determining", which depends on the context.

Performing entities related in the disclosure include: a base station and User Equipment (UE) in mobile communication networks such as the Long Term Evolution (LTE)-

NR interworking, 5G NR and other systems. The base station may be a base station provided with a large-scale antenna array, a secondary base station, etc. The UE may be a user terminal, a user node, a mobile terminal or a tablet or the like. During specific implementation, the base station and the terminal are independent from each other, and are also mutually connected, to jointly implement the technical solutions provided in the disclosure.

The application scenario of the disclosure: the terminal needs to send information to the base station with an unlicensed spectrum resource, i.e., the terminal needs to send uplink information. If the base station follows a resource scheduling mode in the related art, for example, a resource scheduling mode for a licensed spectrum, i.e., sending a scheduling instruction to a target UE first, and then scheduling an uplink transmission resource according to the scheduling instruction, due to the problem of a channel occupation uncertainty of the unlicensed spectrum, it is very possible that the scheduled transmission resource is occupied by other systems such as the WiFi system, and cannot carry the uplink information of the target UE.

In view of this, the disclosure provides a method for transmitting uplink information, which may be applied to a base station. Referring to FIG. 1 that is a flow chart showing a method for transmitting uplink information according to an exemplary embodiment, the method includes the following operations.

In Operation 11, uplink transmission configuration information for target uplink information is determined, the uplink transmission configuration information is used to notify a terminal of how to transmit the target uplink information with an unlicensed spectrum resource.

The target uplink information in the disclosure is uplink information known to the base station. The target uplink information may be HARQ feedback information for scheduled downlink data transmission, and may also be information such as uplink service data scheduled by the base station, or, a configured uplink signal.

In an embodiment of the disclosure, the scheduled downlink data transmission may be downlink data transmission for the target UE completed by the base station in the unlicensed spectrum resource in occupied preset time. Within the occupied preset channel time, the base station does not receive the HARQ feedback information of the target UE for the downlink data transmission.

In the disclosure, the uplink transmission configuration information determined by the base station is used to notify the terminal of how to transmit the target uplink information with the unlicensed spectrum resource. Specifically, the uplink transmission configuration information is used to notify the terminal of how to determine a target uplink transmission resource, the target uplink transmission resource is an unlicensed spectrum resource used for carrying transmission of the target uplink information.

In an embodiment, the uplink transmission configuration information may at least include: transmission occasion indication information.

The transmission occasion indication information is used to indicate that the terminal determines a target transmission resource, the target transmission resource includes: a target uplink transmission resource used to carry the transmission of the target uplink information.

In an implementation mode, the transmission occasion indication information is used to notify the terminal of determining the target uplink transmission resource based on an unlicensed spectrum resource that is initiated for occupancy.

In the disclosure, the target transmission resource determination terminal, such as the base station or the terminal, initiates channel detection such as the LBT detection for occupancy of the unlicensed spectrum resource, and occupies, once the channel occupancy is successful, the unlicensed spectrum resource for preset time duration agreed by the system for information transmission.

In an embodiment, the transmission occasion indication information may indicate that the terminal transmits the target uplink information with an unlicensed spectrum resource that is initiated by the base station for occupancy, and may be referred to as first occasion indication information in the disclosure.

Correspondingly, the terminal may determine the target transmission resource according to the first transmission occasion indication information, such that the terminal determines the target uplink transmission resource subsequently based on the target transmission resource according to system agreements or according to preset trigger signaling sent by the base station with the subsequently occupied unlicensed spectrum resource.

In another embodiment of the disclosure, the transmission occasion indication information may also indicate that the terminal transmits the target uplink information with an unlicensed spectrum resource that is initiated by the terminal itself for occupancy, and may be referred to as second occasion indication information in the disclosure.

Correspondingly, upon the reception of the above second occasion indication information, the terminal may initiate idle channel detection such as the LBT detection on the unlicensed spectrum to send the target uplink information to the base station through the unlicensed spectrum resource that is initiated by the terminal itself for occupancy, and unnecessarily wait for the unlicensed spectrum idle channel resource subsequently occupied by the base station to transmit the target uplink information, thereby ensuring that the target uplink information is sent to the base station as soon as possible.

In an embodiment of the disclosure, the preset number of bits may be used to carry the transmission occasion indication information. Exemplarily, with the assumption that one bit is used to carry the transmission occasion indication information, the system may agree: if the bit is set to 1, the first occasion indication information is indicated; and if the bit is set to 0, the second occasion indication information is indicated. The above corresponding relationship may be as shown in Table 1.

TABLE 1

| Preset bit | Transmission occasion indication information | Channel detection main body |
|---|---|---|
| 1 | First occasion indication information | Base station |
| 0 | Second occasion indication information | Terminal |

As shown in Table 1, the corresponding first occasion indication information indicates that the target uplink information is transmitted with the unlicensed spectrum idle channel resource that is initiated by the base station for occupancy: and the second occasion indication information indicates that the target uplink information is transmitted with the unlicensed spectrum idle channel resource that is initiated by the terminal itself for occupancy.

In another embodiment of the disclosure, the uplink transmission configuration information determined by the base station may further include resource indication information, the resource indication information is used to notify and indicate the terminal of how to determine the target uplink transmission resource based on the target transmission resource.

In the disclosure, according to different transmission occasion indication information, contents indicated by the resource indication information may also be different.

First resource indication information is used to notify the terminal of determining the target uplink transmission resource in the target transmission resource according to a preset trigger instruction sent by the base station.

In an embodiment of the disclosure, the first resource indication information may be cooperatively used with the first occasion indication information, such that the terminal determines the target uplink transmission resource according to the preset trigger instruction in the unlicensed spectrum resource that is subsequently initiated by the base station for occupancy.

That is, in the embodiment of the disclosure, the uplink transmission configuration information determined by the base station may include: the first occasion indication information and the first resource indication information. The first occasion indication information is used to notify the terminal of determining the unlicensed spectrum resource that is subsequently initiated by the base station for occupancy as the target transmission resource: and the first resource indication information is used to notify the terminal of determining the target uplink transmission resource according to the preset trigger instruction sent by the base station in the unlicensed spectrum resource that is subsequently initiated by the base station for occupancy.

In another embodiment of the disclosure, the first resource indication information may also be cooperatively used with the second occasion indication information, such that the terminal determines, after successfully occupying the unlicensed spectrum idle channel resource, the target uplink transmission resource according to the preset trigger instruction sent by the base station in the unlicensed spectrum resource occupied by the terminal. The specific determination process will be described below in detail in the embodiment of the terminal side.

That is, in the embodiment of the disclosure, the uplink transmission configuration information determined by the base station include: the second occasion indication information and the first resource indication information. The second occasion indication information is used to notify the terminal of initiating the occupancy of the unlicensed spectrum idle channel resource: and the first resource indication information is used to notify the terminal of determining the target uplink transmission resource according to the preset trigger instruction sent by the base station in the unlicensed spectrum resource that is initiated by the terminal itself for occupancy.

The second resource indication information may also be referred to as uplink resource position indication information, and is cooperatively used with the second occasion indication information. The uplink resource position indication information may include: one or more preset resource detection positions, used to indicate that the terminal performs unlicensed spectrum idle channel detection at the preset resource detection position. If the detection of the terminal at the preset resource position is successful, the target uplink information is transmitted with an unlicensed spectrum idle channel resource occupied at the detection position. The preset resource detection position mainly refers to a time domain position, and may also be a time-frequency position specified on the unlicensed spectrum.

In the embodiment of the disclosure, the uplink transmission configuration information includes: the second occasion indication information and the uplink resource position indication information. The second indication information is used to notify the terminal of initiating the occupancy of the unlicensed spectrum idle channel resource; and the uplink resource position indication information is used to notify the terminal of a position at which the occupancy of the unlicensed spectrum channel is initiated.

In Operation 12, the uplink transmission configuration information is sent to the terminal, such that the terminal transmits the target uplink information with the unlicensed spectrum resource according to the uplink transmission configuration information.

In an embodiment of the disclosure, the base station may send the uplink transmission configuration to the terminal when sending the scheduling instruction on the occupied unlicensed spectrum resource.

Exemplarily, it is assumed that the target uplink information is HARQ feedback information for scheduled downlink data transmission. Before the base station schedules the downlink data transmission, as the time duration of occupying the channel each time is preset by the system, and is, for example, 10 ms, the base station may estimate whether the target uplink transmission resource can be allocated to the terminal within the present preset channel occupancy time duration, to carry HARQ feedback information for the downlink data transmission to be scheduled: and if no enough time domain resource within the present channel occupancy time duration is allocated to the terminal for HARQ feedback, the base station may load the uplink transmission configuration information in a scheduling instruction for scheduling the downlink data transmission, the uplink transmission configuration information is used to notify the terminal of how to transmit the HARQ feedback information corresponding to the downlink data transmission to be scheduled, such that when sending scheduling information for the downlink data transmission to the terminal through the scheduling instruction, the base station also sends uplink transmission configuration information for HARQ feedback information transmission to the terminal at the same time, which may refer to the schematic diagram of the application scenario shown in FIG. 4(A) and FIG. 4(B) below:

That is, the base station may send the uplink transmission configuration information to the terminal by loading the uplink transmission configuration information into the scheduling instruction for the downlink data transmission.

Further, the base station may send the uplink transmission configuration information to the terminal by loading the uplink transmission configuration information into a preset information domain of the scheduling instruction.

The preset information domain may be an information domain added in the scheduling instruction, or an existing preset information domain that is multiplexed. The information domain may occupy the preset number of bits. Exemplarily, for the case where the transmission configuration information includes the transmission occasion indication information, the base station may add an information domain having resource occupancy of one bit in the scheduling instruction, such that the scheduling instruction carries different types of transmission occasion indication information, as shown in the above Table 1.

Correspondingly, the terminal may parse a preset information domain of the scheduling instruction to obtain the uplink transmission configuration information for the target uplink information using information domain configuration information that is obtained in advance, thereby determining the target uplink transmission resource according to the uplink transmission configuration information, and sending the target uplink information to the base station with the target uplink transmission resource.

The information domain configuration information may be agreed by the system, or is dynamically configured by the base station before sending the uplink transmission configuration information to the terminal.

Figure 2:
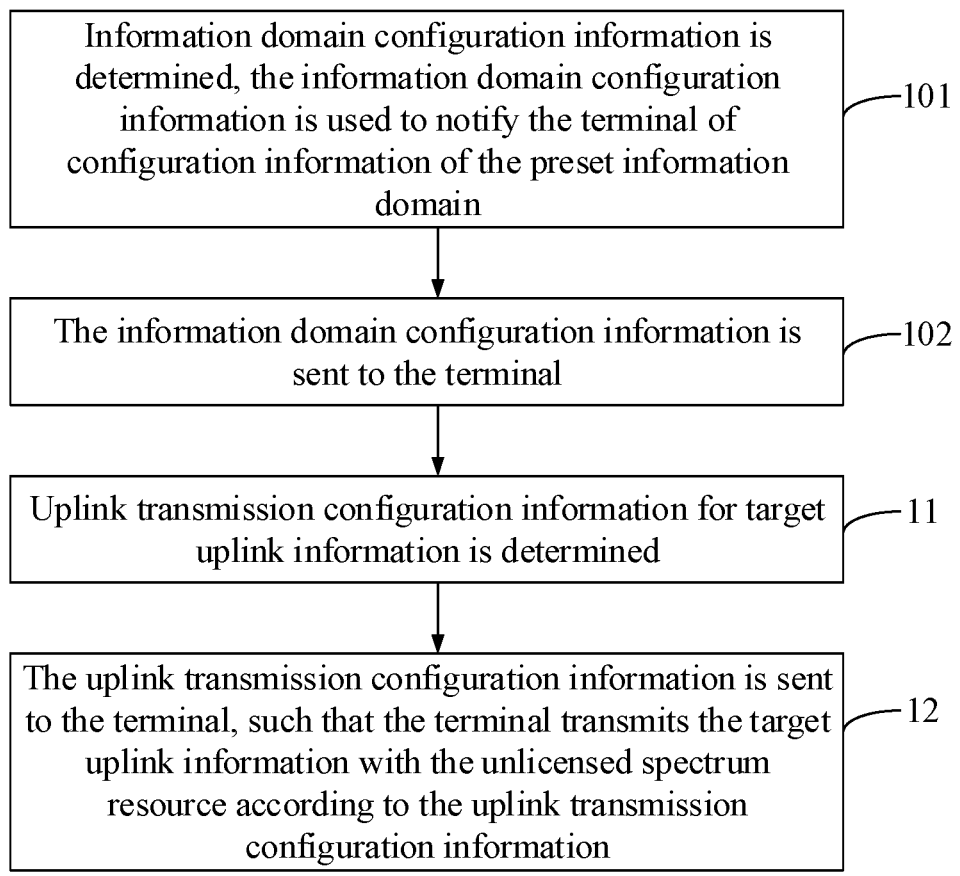
FIG. 2 is a flow chart showing another method for transmitting uplink information according to an exemplary embodiment of the disclosure.

The case where the base station configures the preset information domain may refer to FIG. 2 that is a flow chart showing another method for transmitting uplink information according to an exemplary embodiment. Before Operation 11, the method may further include the following operations.

In Operation 101, information domain configuration information is determined, the information domain configuration information is used to notify the terminal of configuration information of the preset information domain.

The information domain configuration information may include at least one of: position information of the preset information domain, length information of the preset information domain and preset evaluation indication information.

The position information is used to notify the terminal of a specific position or a start position of the preset information domain in the scheduling instruction.

The length information is used to notify the terminal of a resource length occupied by the preset information domain in the scheduling instruction, such as the number of occupied bits.

The preset evaluation indication information is used to notify the terminal of when different values are assigned to the preset information domain, what configuration information that they represent, exemplarily, as shown in the above Table 1.

In Operation 102, the information domain configuration information is sent to the terminal.

In the disclosure, the base station may send the information domain configuration information to the terminal by using upper signaling or physical layer signaling. The upper signaling may be Radio Resource Control (RRC) signaling, and Medium Access Control (MAC) Control Element (CE) signaling.

Figure 3:
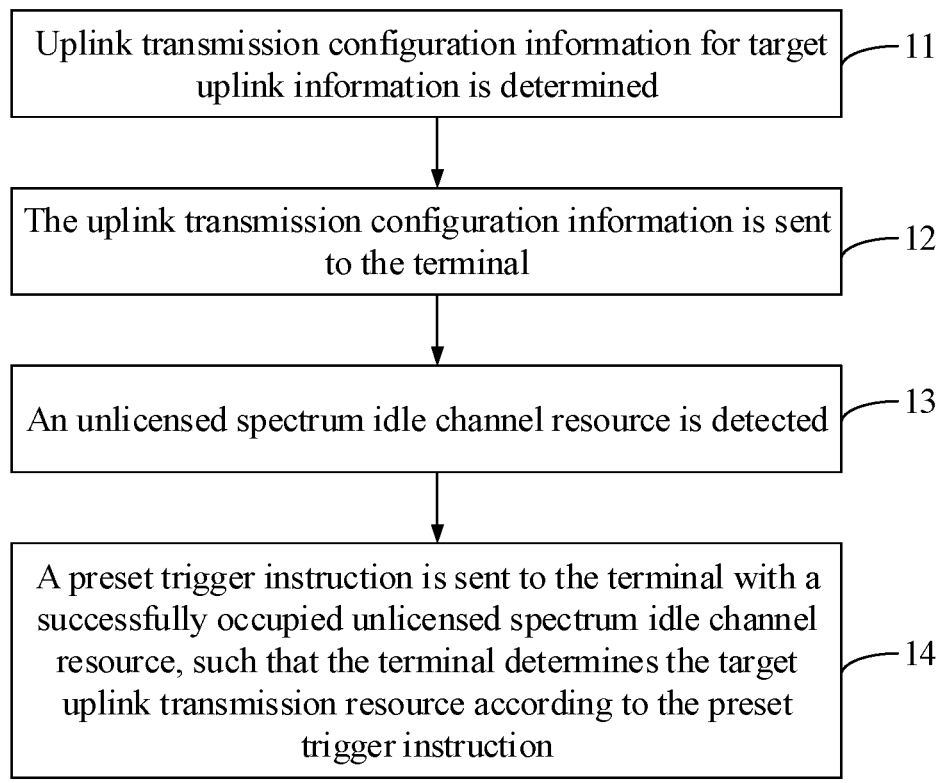
FIG. 3 is a flow chart showing another method for transmitting uplink information according to an exemplary embodiment of the disclosure.

Referring to FIG. 3 that is a flow chart showing another method for transmitting uplink information according to an exemplary embodiment, corresponding to the case where the transmission occasion indication information is the above first occasion indication information, after Operation 12, the method may further include the following operations.

In Operation 13, an unlicensed spectrum idle channel resource is detected.

Regarding the channel detection of the unlicensed spectrum, when working in the unlicensed spectrum, the base station needs to jointly compete for unlicensed spectrum resources with other systems such as the WiFi, and thus also needs to follow the channel detection mechanism, such as the LBT detection mechanism used by the WiFi system. Regarding the channel detection mechanism, in the wireless communication systems, when an information sending terminal needs to transmit information to an information receiving terminal with the unlicensed spectrum resource, idle channel detection is first performed at the unlicensed spectrum, so as to determine whether an available resource exists at present.

In the embodiment of the disclosure, the base station may continuously initiate the occupation of the idle channel resource on the unlicensed spectrum after the previous channel occupancy time duration is ended, such that the terminal may determine the target uplink transmission resource with the unlicensed spectrum idle channel resource that is subsequently occupied by the base station, and transmit the target uplink information.

In Operation 14, a preset trigger instruction is sent to the terminal with a successfully occupied unlicensed spectrum idle channel resource, such that the terminal determines the target uplink transmission resource according to the preset trigger instruction.

In related communication protocols, the time domain range of the unlicensed spectrum resource that may be occupied by the base station when the channel detection is successful is agreed by the system, such as a Maximum Channel Occupancy Time (MCOT) like 10 ms agreed by the system. The base station may schedule a transmission resource corresponding to the MCOT after the channel detection is successful for data transmission. The data transmission may include uplink data transmission, may also include downlink data transmission, and may further include: one or more uplink and downlink transmission handovers.

In the embodiment of the disclosure, after sending the uplink transmission configuration information, the base station may initiate the occupancy of the unlicensed spectrum resource, and send the preset trigger instruction to the terminal with the unlicensed spectrum resource that is subsequently initiated for occupancy, such that the terminal determines the target uplink transmission resource according to the preset trigger instruction, and sends the target uplink information to the base station with the target uplink transmission resource.

Figure 4A:
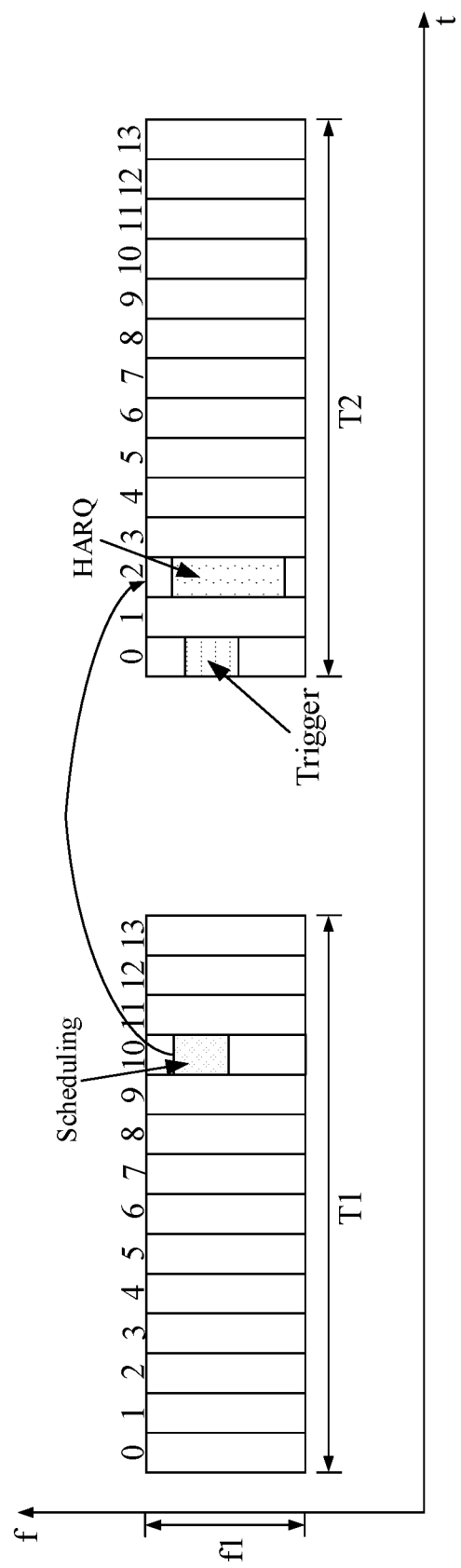
FIG. 4(A) is a schematic diagram showing an application scenario for transmitting uplink information according to an exemplary embodiment of the disclosure.
Figure 4B:
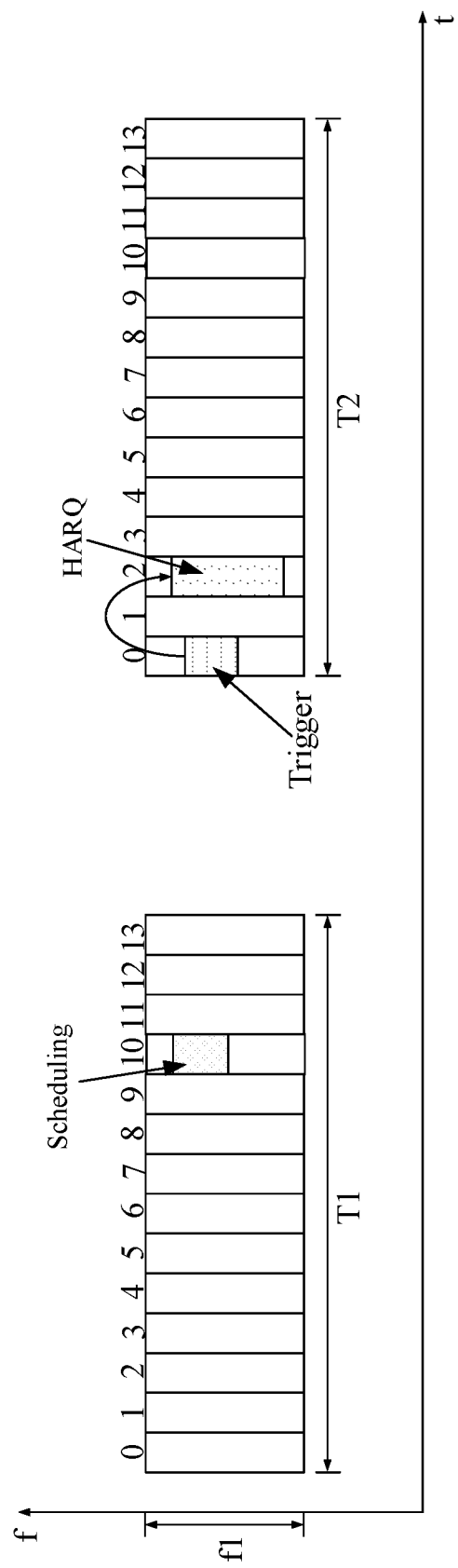
FIG. 4(B) is a schematic diagram showing another application scenario for transmitting uplink information according to an exemplary embodiment of the disclosure.

Refer to FIG. 4(A) and FIG. 4(B) that are a schematic diagram showing an application scenario for transmitting uplink information according to an exemplary embodiment.

As shown in FIG. 4(A), the base station sends a scheduling instruction to the terminal within previously occupied preset channel time duration (i.e., first channel occupancy time duration T1) on unlicensed spectrum f1. It is assumed that the preset channel occupancy time duration is 14 symbols, i.e., symbols numbered as 0-13 in the figure. The base station sends a scheduling instruction to the terminal in the first channel occupancy time duration T1, and sends the uplink transmission configuration information to the terminal by loading the uplink transmission configuration information into a preset information domain of the scheduling instruction. The uplink transmission configuration information includes: first occasion indication information and first resource indication information. When successfully detecting a new unlicensed spectrum resource, the base station determines second channel occupancy time duration T2, sends a preset trigger instruction to the terminal at, for example, the 0 symbol position within T2, such that the terminal determines, according to the preset trigger instruction, a target uplink transmission resource such as the second symbol for carrying HARQ feedback information of scheduled downlink data transmission, and sends the HARQ feedback information to the base station with the resource at the second symbol within the second channel occupancy time duration T2. In FIG. 4(A), the preset trigger instruction is merely used to trigger the terminal to determine the target uplink transmission resource, i.e., notifying the terminal of determining the target uplink transmission resource within the preset channel time of the presently occupied unlicensed spectrum.

The indication information of how to determine the target uplink resource based on the preset trigger instruction is still notified to the terminal through the scheduling instruction.

FIG. 4(B) illustrates another schematic diagram for transmitting uplink information. Different from FIG. 4(A), the preset trigger instruction sent by the base station within T2 further includes: resource indication information of the target uplink transmission resource, such that the terminal starts determining the target uplink transmission resource after receiving the trigger instruction within T2, and determines the target uplink transmission resource according to resource position indication information included in the preset trigger instruction.

In the disclosure, when determining that the terminal is required to transmit target uplink information, the base station may notify, through uplink transmission configuration information, the terminal of how to determine a target uplink transmission resource on an unlicensed spectrum, such that the terminal timely sends the target uplink information to the base station with the target uplink transmission resource, thereby reducing the transmission latency of the uplink information due to a channel occupancy uncertainty of the unlicensed spectrum and limited channel occupancy time duration, and improving the user experience that the terminal transmits the uplink information with the unlicensed spectrum resource in the 5G NR system, and particularly, shortening the latency that the terminal transmits the latency sensitive information with the unlicensed spectrum resource.

Figure 5:
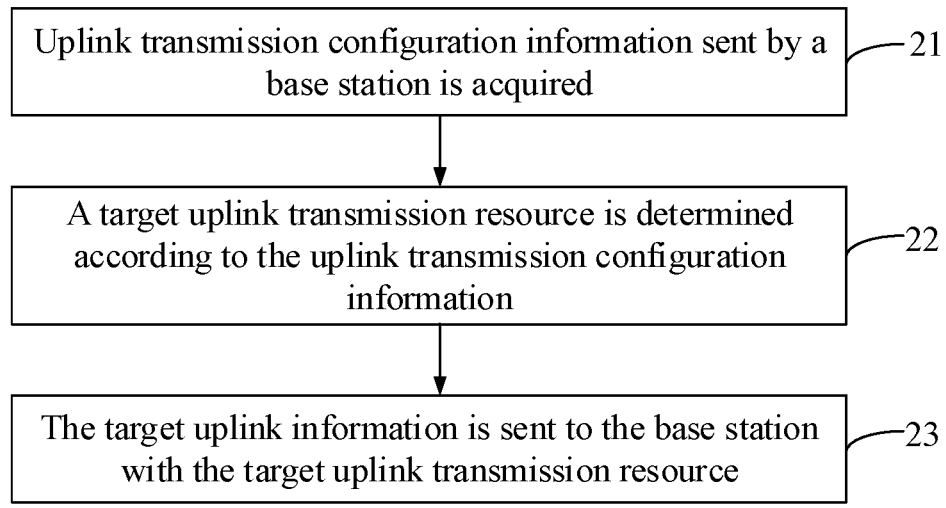
FIG. 5 is a flow chart showing a method for transmitting uplink information according to an exemplary embodiment of the disclosure.

Correspondingly, the disclosure provides a method for transmitting uplink information, which may be applied to a terminal. Referring to FIG. 5 that is a flow chart showing a method for transmitting uplink information according to an exemplary embodiment, the method may include the following operations.

In Operation 21, uplink transmission configuration information sent by a base station is acquired, the uplink transmission configuration information is used to notify the terminal of how to transmit target uplink information with an unlicensed spectrum resource.

The operation corresponds to Operation 12. In an embodiment of the disclosure, the terminal may acquire the uplink transmission configuration information from broadcast signaling and RRC signaling sent by the base station.

In another embodiment of the disclosure, the terminal may acquire the uplink transmission configuration information from a scheduling instruction sent by the base station.

In an embodiment, the terminal may parse a preset information domain of the scheduling signaling according to information domain configuration information obtained in advance, to obtain the uplink transmission configuration information.

Regarding how the terminal obtains the information domain configuration information, the information domain configuration information may be predefined by the system, and the information domain configuration information may be information fixedly provided in a communication chip of the terminal when the terminal leaves the factory. In an embodiment, the terminal may also obtain, when accessing a cell network within a signal coverage of the base station, the information domain configuration information through system information sent by the base station.

In another embodiment of the disclosure, the terminal may also receive the information domain configuration information dynamically configured by the base station.

Figure 6:
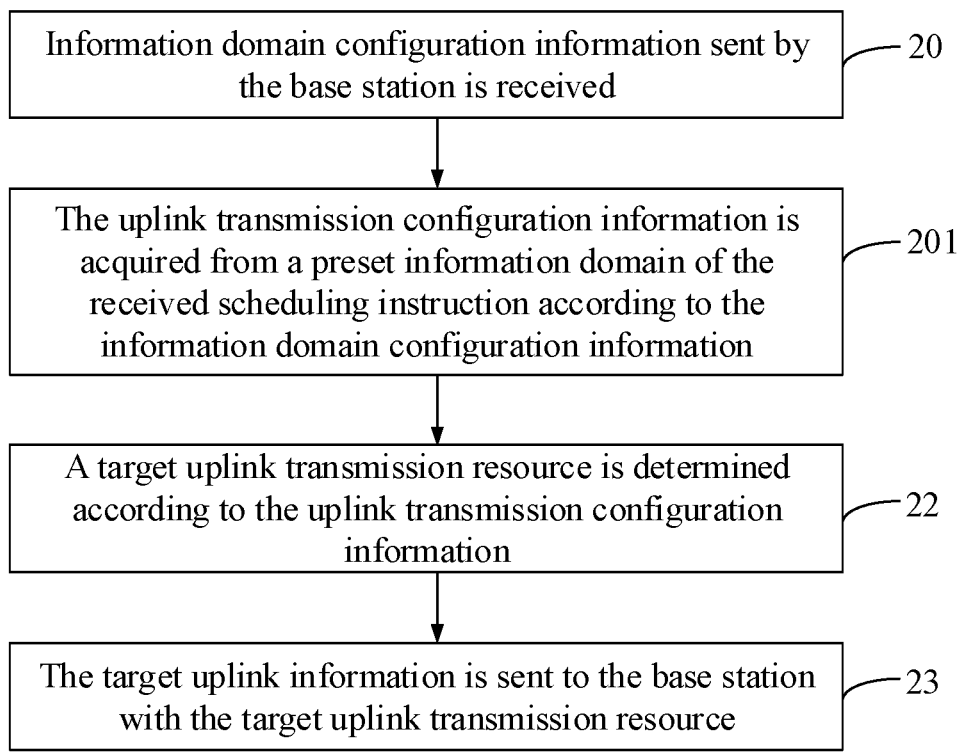
FIG. 6 is a flow chart showing another method for transmitting uplink information according to an exemplary embodiment of the disclosure.

Referring to FIG. 6 that is a flow chart showing another method for transmitting uplink information according to an exemplary embodiment, before Operation 21, the method may further include the following operation.

In Operation 20, information domain configuration information sent by the base station is received.

The information domain configuration information is used to notify the terminal of related configuration information of an information domain carrying the uplink transmission configuration information in the scheduling signaling.

The information domain configuration information may include: at least one of the following information: a set position of the information domain in the scheduling instruction, an occupied resource length, a physical meaning represented by the information domain when the information domain is assigned with different values, a multiplexing mode, and a start position.

Correspondingly, Operation 21 may specifically as follows.

In Operation 201, the uplink transmission configuration information is acquired from a preset information domain of the received scheduling instruction according to the information domain configuration information.

For contents included in the information domain configuration information, Operation 21 may include the following operations.

A position of the preset information domain in the scheduling instruction is determined according to position information of the preset information domain.

The uplink transmission configuration information is obtained by parsing the preset information domain of the scheduling instruction according to evaluation indication information of the preset information domain.

In Operation 22, a target uplink transmission resource is determined according to the uplink transmission configuration information, the target uplink transmission resource is an unlicensed spectrum resource used for carrying transmission of the target uplink information.

In the disclosure, the uplink transmission configuration information may at least include: transmission occasion indication information. As mentioned above, the transmission occasion indication information is used to notify the terminal of transmitting the target uplink information with an unlicensed spectrum idle channel resource occupied by the base station or the terminal.

Figure 7:
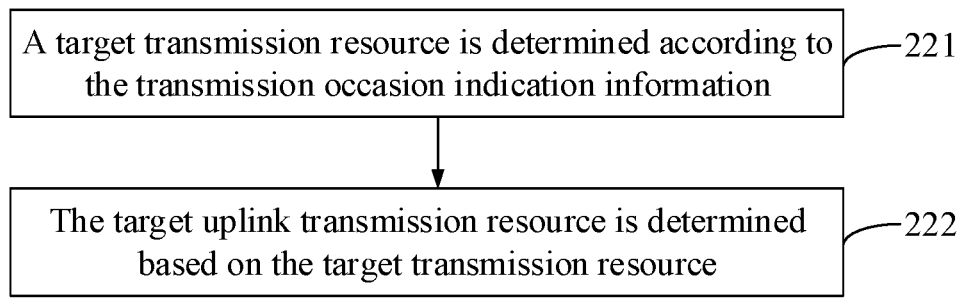
FIG. 7 is a flow chart showing another method for transmitting uplink information according to an exemplary embodiment of the disclosure.

Referring to FIG. 7 that is a flow chart showing another method for transmitting uplink information according to an exemplary embodiment, Operation 22 may include the following operation.

In Operation 221, a target transmission resource is determined according to the transmission occasion indication information.

The target transmission resource includes the target uplink transmission resource.

In the disclosure, according to different transmission occasion indication information, the terminal may determine the target transmission resource with any one of the following modes.

First mode, the transmission occasion indication information is the above first occasion indication information, i.e., the terminal is notified of transmitting the target uplink information with an unlicensed spectrum resource that is subsequently initiated by the base station for occupancy.

Figure 8:
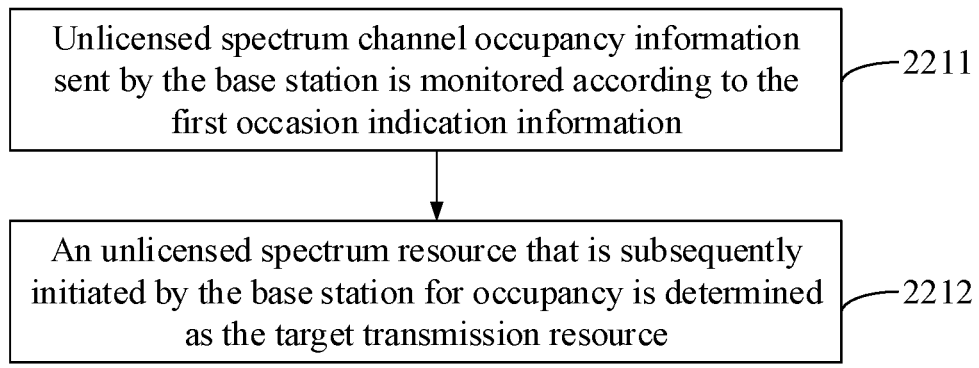
FIG. 8 is a flow chart showing another method for transmitting uplink information according to an exemplary embodiment of the disclosure.

Referring to FIG. 8 that is a flow chart showing another method for transmitting uplink information according to an exemplary embodiment, Operation 221 may include the following operations.

In Operation 2211, unlicensed spectrum channel occupancy information sent by the base station is monitored according to the first occasion indication information.

Corresponding to Operation 13, after acquiring the first occasion indication information sent by the base station, the terminal starts monitoring the unlicensed spectrum channel occupancy information sent by the base station, to determine the unlicensed spectrum resource that is subsequently initiated by the base station for occupancy.

In Operation 2212, an unlicensed spectrum resource that is subsequently initiated by the base station for occupancy is determined as the target transmission resource.

In an embodiment of the disclosure, the base station may send a notification message to the terminal after the channel occupancy is successful, to notify the UE of determining the target uplink transmission resource within present channel occupancy time duration. Correspondingly, upon the reception of the above notification message, the terminal may determine an unlicensed spectrum resource with a preset time duration currently occupied by the base station as the target transmission resource.

Second mode, the transmission occasion indication information is the above second occasion indication information, i.e., the terminal is notified of transmitting the target uplink information with an unlicensed spectrum resource that is initiated by the terminal itself for occupancy.

Figure 9:
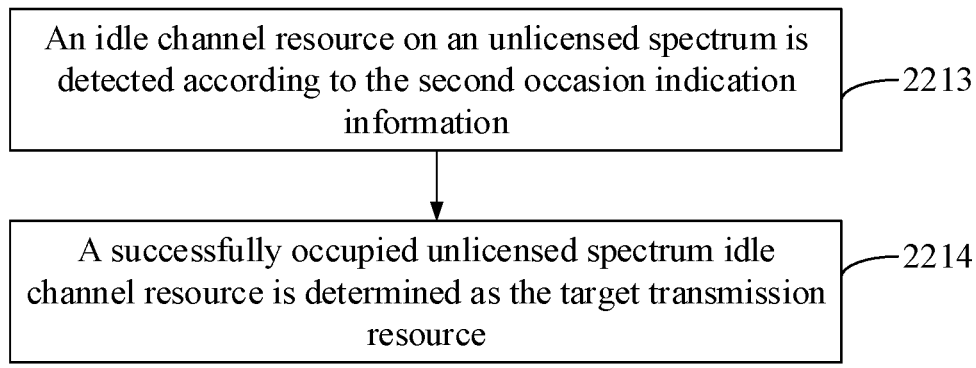
FIG. 9 is a flow chart showing another method for transmitting uplink information according to an exemplary embodiment of the disclosure.

Referring to FIG. 9 that is a flow chart showing another method for transmitting uplink information according to an exemplary embodiment, Operation 221 may include the following operations.

In Operation 2213, an idle channel resource on an unlicensed spectrum is detected according to the second occasion indication information.

In the disclosure, after determining target uplink information to be sent, the terminal may start detecting the idle channel resource on the unlicensed spectrum according to the second occasion indication information.

In an embodiment of the disclosure, the uplink transmission configuration information may further include: preset resource detection position information: the preset resource detection position information is used to indicate that the terminal performs unlicensed spectrum idle channel resource detection at a preset resource detection position: and the preset resource detection position information may include: one or more preset resource detection positions.

The operation that the unlicensed spectrum idle channel resource is detected in Operation 2213 may specifically as follows.

The unlicensed spectrum idle channel resource is detected at the preset resource detection position.

In the disclosure, the base station may notify, through the uplink transmission configuration information, the terminal of performing the idle channel detection at one or more preset resource detection positions, such that the terminal determines an unlicensed spectrum resource successfully occupied at any position as the target transmission resource.

In Operation 2214, a successfully occupied unlicensed spectrum idle channel resource is determined as the target transmission resource.

If the terminal successfully occupies the channel resource on the unlicensed spectrum, the channel resource may be occupied for preset time such as 10 ms according to system agreements. In an embodiment, the channel occupancy time duration may also be dynamically determined based on the system agreements and according to preset information such as the device type and to-be-transmitted service type, which is not limited by the disclosure.

In Operation 222, the target uplink transmission resource is determined based on the target transmission resource.

Corresponding to the first mode of Operation 221, the uplink transmission configuration information may further include: first resource indication information, the first resource indication information is used to notify the terminal of determining the target uplink transmission resource according to a preset trigger instruction sent by the base station: and corresponding to the uplink transmission configuration information, an application scenario of the first occasion indication information and the first resource indication information is included.

Figure 10:
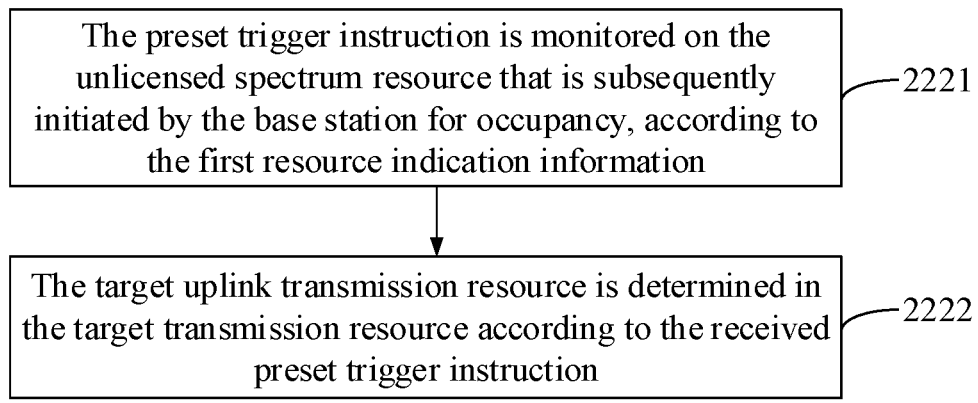
FIG. 10 is a flow chart showing another method for transmitting uplink information according to an exemplary embodiment of the disclosure.

Referring to FIG. 10 that is a flow chart showing another method for transmitting uplink information according to an exemplary embodiment, Operation 222 may include the following operations.

In Operation 2221, the preset trigger instruction is monitored on the unlicensed spectrum resource that is subsequently initiated by the base station for occupancy, according to the first resource indication information.

In Operation 2222, the target uplink transmission resource is determined in the target transmission resource according to the received preset trigger instruction.

In the disclosure, according to different contents included in the preset trigger instruction, Operation 2222 may include the following at least two implementation modes.

First implementation mode, the preset trigger instruction is used to indicate a time-frequency position of the target uplink transmission resource.

Correspondingly, Operation 2222 may include that: a time-frequency position of the target uplink transmission resource is determined in the target transmission resource according to the preset trigger instruction.

In the embodiment of the disclosure, the base station explicitly notifies, in the sent preset trigger instruction, the terminal of the time-frequency position of the target uplink transmission resource, such as the embodiment shown in FIG. 4(B).

Second implementation mode, the trigger instruction is used to indicate a start position of the target uplink transmission resource.

Figure 11:
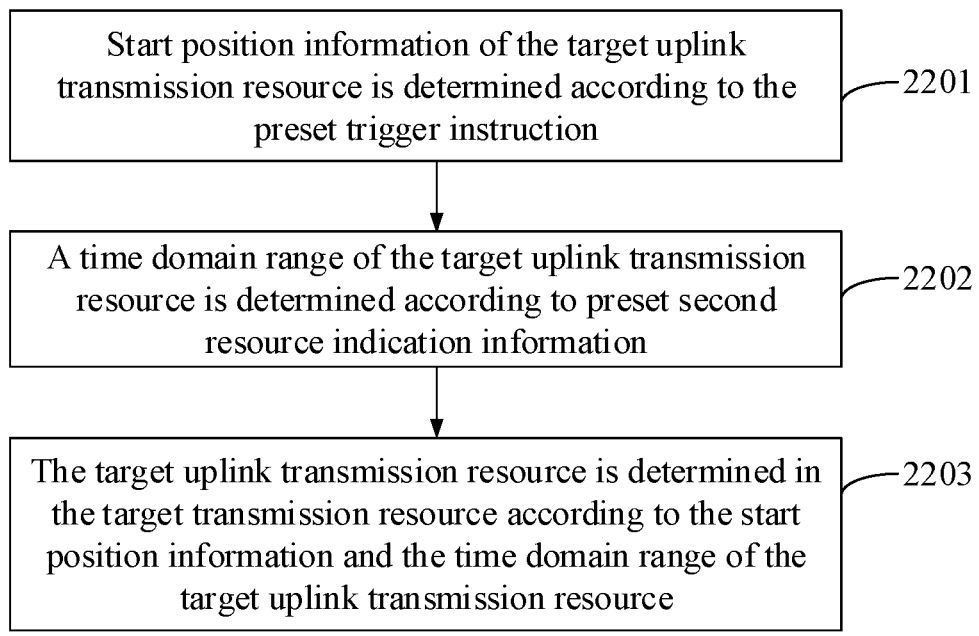
FIG. 11 is a flow chart showing another method for transmitting uplink information according to an exemplary embodiment of the disclosure.

Referring to FIG. 11 that is a flow chart showing another method for transmitting uplink information according to an exemplary embodiment, Operation 2222 may include the following operations.

In Operation 2201, start position information of the target uplink transmission resource is determined according to the preset trigger instruction.

In an embodiment of the disclosure, the preset trigger instruction may indicate that the terminal determines a position of the received preset trigger instruction as the start position of the target uplink transmission resource.

In another embodiment of the disclosure, the preset trigger instruction may also indicate that the terminal determines a preset resource position, such as, two symbols, after the reception of the trigger instruction as the start position of the target uplink transmission resource.

Exemplarily, as shown in FIG. 4(A) or FIG. 4(B), with the assumption that the terminal receives the preset trigger instruction at a first symbol position of the unlicensed spectrum resource T2 successfully occupied by the base station, a third symbol position is determined as the start position of the target uplink transmission resource.

In Operation 2202, a time domain range of the target uplink transmission resource is determined according to preset second resource indication information, the preset second resource indication information is used to indicate occupancy time duration of the target uplink transmission resource in the target transmission resource.

In an embodiment of the disclosure, the second resource indication information may be agreed by the system, and may also be a part of information of the uplink transmission configuration information that is sent to the terminal through the scheduling instruction. The preset second resource indication information is used to indicate the occupancy time duration of the target uplink transmission resource.

In Operation 2203, the target uplink transmission resource is determined in the target transmission resource according to the start position information and the time domain range of the target uplink transmission resource.

After the start position and the time domain range of the target uplink transmission resource in the target transmission resource are determined, the target uplink transmission resource may be determined in the target transmission resource.

Exemplarily, with the assumption that the occupancy time duration of the target uplink transmission resource is one symbol, and the terminal receives the preset trigger instruction at the first symbol position of the unlicensed spectrum resource successfully occupied by the base station, the terminal determines a resource corresponding to the third symbol of the unlicensed spectrum resource successfully occupied by the base station as the target uplink transmission resource, as shown in FIG. 4(A).

In the embodiment of the disclosure, the base station may notify the terminal of the second resource indication information through the uplink transmission configuration information sent in advance. When sending the trigger instruction subsequently, the terminal may only need to notify the start position of the target uplink transmission resource, thereby effectively saving the system signaling overhead, preventing the preset trigger instruction from affecting transmission of the service data due to occupancy of excessive unlicensed spectrum resource, and improving the utilization rate of the unlicensed spectrum resource.

In the first case, the terminal determines the target uplink transmission resource in the target transmission resource according to the preset trigger instruction sent by the base station, such that the accuracy of the target uplink transmission resource may be improved, thereby improving the transmission reliability of the target uplink transmission information, and preventing an increase in transmission latency of the target uplink transmission information due to misjudgment of the target uplink transmission resource.

Second case, corresponding to the second mode of Operation 221, i.e., the case where the base station notifies the terminal of transmitting the target uplink information with the unlicensed spectrum resource that is initiated by the terminal itself for occupancy, the implementation of Operation 222 may also include the following three implementation modes.

First implementation mode, the terminal may notify the base station after successfully occupying the unlicensed spectrum resource. In the process of subsequently determining the target uplink transmission resource, the preset trigger instruction sent by the base station may also be monitored in the occupied unlicensed spectrum resource, and the target uplink transmission resource is determined according to the preset trigger instruction sent by the base station. The specific implementation mode is similar to the implementation mode that the terminal determines the target uplink transmission resource based on the first occasion indication information and the preset trigger instruction, and will not be repeated herein.

Second implementation mode, it corresponds to the case where the uplink transmission configuration information includes the uplink resource position indication information, i.e., the uplink transmission configuration information includes: the second occasion indication information and the uplink resource position indication information. The uplink resource position indication information may include: one or more preset resource detection positions.

Operation 222 may include that: an idle channel resource detected at the preset resource detection position is determined as the target uplink transmission resource.

Third implementation mode, the uplink transmission configuration information may further include: third resource indication information. The third resource indication information is used to indicate position information of the target uplink transmission resource in an unlicensed spectrum resource successfully occupied by the terminal.

Operation 222 may include that: the target uplink transmission resource is determined from an occupied unlicensed spectrum idle channel resource according to the third resource indication information.

In the embodiment of the disclosure, if the base station notifies the terminal of the position information of the target uplink transmission resource in advance through the uplink transmission configuration information, for example, Nth to (N+2)th slots from a channel occupancy successful position, the terminal may determine a position of the target uplink transmission resource according to the third resource indication information after successfully detecting the unlicensed spectrum idle channel resource according to the second occasion indication information, such that the signaling overhead may be saved compared with the case where the target uplink transmission resource is determined according to the preset trigger instruction sent by the base station.

In Operation 23, the target uplink information is sent to the base station with the target uplink transmission resource.

As mentioned above, the target uplink information may be HARQ feedback information for scheduled downlink transmission, and may also be information such as uplink service data scheduled by the base station and a configured uplink signal.

Exemplarily, with the case where the target uplink information is the HARQ feedback information of the scheduled downlink data transmission, after determining the time-frequency range of the target uplink transmission resource in the unlicensed spectrum resource that is initiated by the terminal itself for occupancy or in the unlicensed spectrum resource that is subsequently initiated by the base station for occupancy, the terminal may send the HARQ feedback information of the scheduled downlink data transmission to the base station with the target uplink transmission resource when the target uplink transmission resource arrives, such that the transmission latency that the HARQ feedback information is transmitted through the unlicensed spectrum resource is reduced, and the user experience of the terminal in the 5G NR system is improved.

Figure 12:
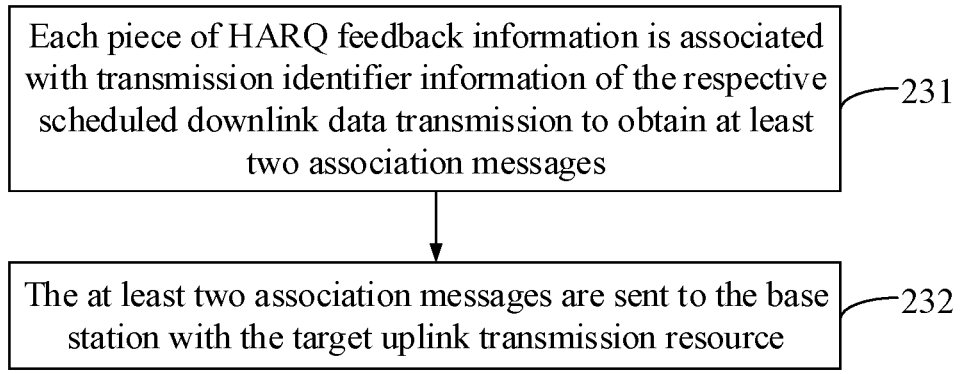
FIG. 12 is a flow chart showing another method for transmitting uplink information according to an exemplary embodiment of the disclosure.

In another embodiment of the disclosure, if the target uplink information includes: at least two pieces of HARQ feedback information respectively corresponding to scheduled downlink data transmission, referring to FIG. 12 that is a flow chart showing another method for transmitting uplink information according to an exemplary embodiment, Operation 23 may include the following operations.

In Operation 231, each piece of HARQ feedback information is associated with transmission identifier information of the respective scheduled downlink data transmission to obtain at least two association messages.

Exemplarily, it is assumed that the base station schedules two times of downlink data transmission, which may be respectively represented as Dd1 and Dd2, for the target UE within previously preset channel time duration, but does not receive the corresponding HARQ feedback information within the previously preset channel time duration.

After detecting and parsing data packets for the two times of downlink data transmission, the terminal generates, according to a downlink data receiving condition, two pieces of HARQ feedback information that may be represented as HARQ1 and HARQ2. The corresponding relationship between the scheduled downlink data transmission and the HARQ feedback information may be shown in Table 2.

TABLE 2

| Scheduled downlink data transmission | HARQ feedback information |
| --- | --- |
| Dd1 | HARQ1 |
| Dd2 | HARQ2 |

In the embodiment of the disclosure, in order to distinguishing HARQ feedback information corresponding to different downlink data transmission, the terminal may associate the transmission identifier information of the scheduled downlink data transmission with the respective HARQ feedback information to generate at least two association messages, each association message representing the corresponding relationship between the scheduled downlink data transmission and the uplink HARQ feedback information.

The transmission identifier information of each scheduled downlink data transmission is identifier information for determining the scheduled downlink data transmission. The transmission identifier information may be resource information for carrying the scheduled downlink data transmission. The resource information may be resource position information or corresponding indication information thereof. The transmission identifier information may also be scheduling signaling information corresponding to the scheduled downlink data transmission: or, the transmission identifier information is HARQ identifier information generated by the terminal according to agreements of system communication protocols, for example, information such as the HARQ serial number sequentially determined according to a transmission time sequence of the scheduled downlink data transmission, which is not limited by the disclosure.

In Operation 232, the at least two association messages are sent to the base station with the target uplink transmission resource.

The terminal sends the at least two association messages to the base station through the target uplink transmission resource after obtaining the association messages, such that the base station clearly distinguishes what the HARQ feedback information for the different downlink data transmission respectively is, and determines, according to the HARQ feedback information, whether the downlink data is to be retransmitted.

In the disclosure, the terminal may first clearly determine a position of the target uplink transmission resource based on the uplink transmission configuration information sent by the base station when needing to transmit the target uplink information with the unlicensed spectrum resource, and send the target uplink information to the base station with the target uplink transmission resource when the target uplink transmission resource arrives. In the process of determining the target uplink transmission resource, the target uplink transmission resource may be determined, according to an indication of the base station, in the unlicensed spectrum resource that is subsequently initiated by the base station for occupancy or in the unlicensed spectrum resource that is initiated by the terminal itself for occupancy, thereby determining the low-latency and high-liability transmission of the target uplink information.

For simple description, each of the above method embodiments is expressed as a combination of a series of operations, but those skilled in the art should know that the disclosure is not limited to the described operation sequence because some operations may be executed in other sequences or at the same time according to the disclosure.

Then, the person skilled in the art should also appreciate that all the embodiments described in the specification are optional embodiments, and the related actions and modules are not necessarily mandatory to the disclosure.

Corresponding to the above application function realization method embodiment, the disclosure further provides embodiments of an application function realization apparatus and a corresponding terminal.

Figure 13:
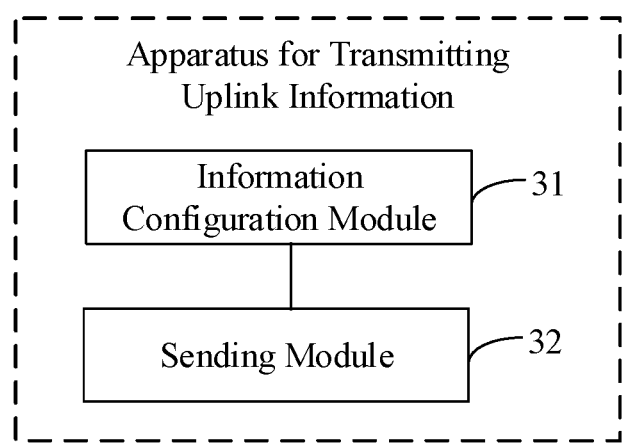
FIG. 13 is a block diagram illustrating another apparatus for transmitting uplink information according to an exemplary embodiment of the disclosure.

Referring to FIG. 13 that is a block diagram illustrating an apparatus for transmitting uplink information according to an exemplary embodiment, the apparatus may be provided in a base station of an NR system, and include: an information configuration module 31, and a sending module 32.

The information configuration module 31 is configured to determine uplink transmission configuration information for target uplink information, the uplink transmission configuration information is used to notify a terminal of how to transmit the target uplink information with an unlicensed spectrum resource.

The sending module 32 is configured to send the uplink transmission configuration information to the terminal, such that the terminal transmits the target uplink information with the unlicensed spectrum resource according to the uplink transmission configuration information.

In an apparatus embodiment of the disclosure, the uplink transmission configuration information may at least include: transmission occasion indication information.

The transmission occasion indication information is used to indicate that the terminal determines a target transmission resource, the target transmission resource includes: a target uplink transmission resource, the target uplink transmission resource being configured to carry an unlicensed spectrum resource of the transmission of the target uplink information.

In an apparatus embodiment of the disclosure, the transmission occasion indication information includes: first occasion indication information.

The first occasion indication information is used to indicate that the terminal transmits the target uplink information with an unlicensed spectrum resource that is initiated by the base station for occupancy.

In another apparatus embodiment of the disclosure, the transmission occasion indication information includes: second occasion indication information.

The second occasion indication information is used to indicate that the terminal transmits the target uplink information with an unlicensed spectrum resource that is initiated by the terminal itself for occupancy.

In an apparatus embodiment of the disclosure, the uplink transmission configuration information may further include: resource indication information, the resource indication information is used to indicate that the terminal determines the target uplink transmission resource based on the target transmission resource.

In an apparatus embodiment of the disclosure, the resource indication information is used to notify the terminal of determining the target uplink transmission resource in the target transmission resource according to a preset trigger instruction sent by the base station.

In another apparatus embodiment of the disclosure, the resource indication information includes uplink resource position indication information, the uplink resource position indication information is used to indicate that the terminal performs idle channel resource detection at a preset resource detection position, and transmits the target uplink information with an unlicensed spectrum idle channel resource at the preset resource detection position after the idle channel resource detection is successful.

In an apparatus embodiment of the disclosure, the sending module is configured to send, when sending a scheduling instruction with an occupied unlicensed spectrum resource, the uplink transmission configuration information to the terminal by placing the uplink transmission configuration information into a preset information domain of the scheduling instruction.

Figure 14:
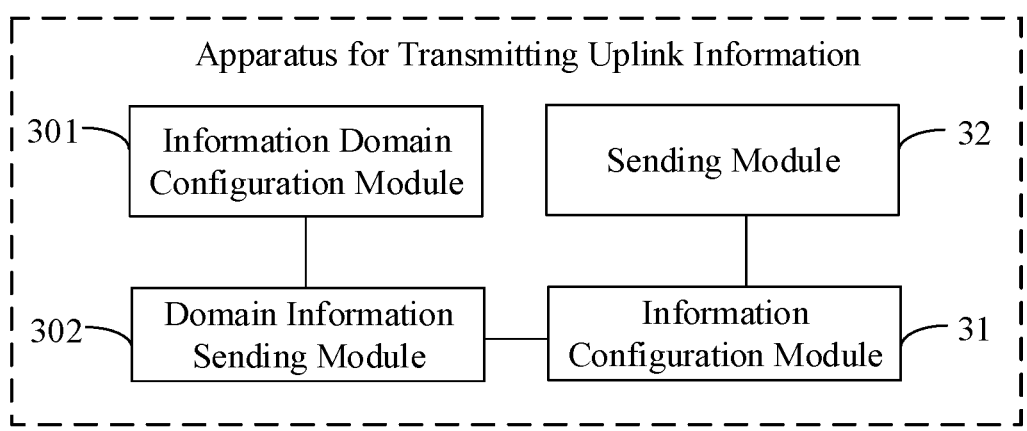
FIG. 14 is a block diagram illustrating another apparatus for transmitting uplink information according to an exemplary embodiment of the disclosure.

Referring to FIG. 14 that is a block diagram illustrating another apparatus for transmitting uplink information according to an exemplary embodiment, on the basis of the apparatus embodiment shown in FIG. 13, the apparatus may further include: an information domain configuration module 301, and a domain information sending module 302.

The information domain configuration module 301 is configured to determine information domain configuration information, the information domain configuration information is used to notify the terminal of configuration information of the preset information domain, and the information domain configuration information includes at least one of the following items: position information of the preset information domain, length information of the preset information domain and preset evaluation indication information.

The domain information sending module 302 is configured to send the information domain configuration information to the terminal.

Figure 15:
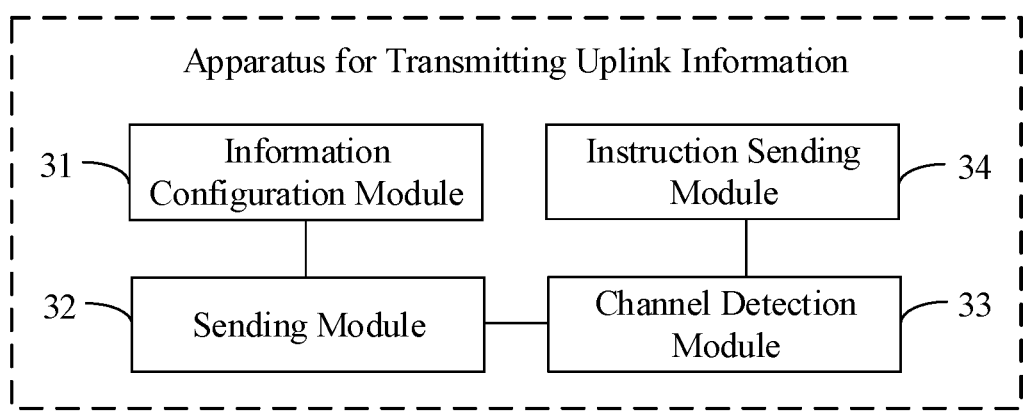
FIG. 15 is a block diagram illustrating another apparatus for transmitting uplink information according to an exemplary embodiment of the disclosure.

Referring to FIG. 15 that is a block diagram illustrating another apparatus for transmitting uplink information according to an exemplary embodiment, on the basis of the apparatus embodiment shown in FIG. 14, if the resource indication information is used to notify the terminal of determining the target uplink transmission resource in the target transmission resource according to the preset trigger instruction sent by the base station, the apparatus may further include: a channel detection module 33, and an instruction sending module 34.

The channel detection module 33 is configured to detect an unlicensed spectrum idle channel resource.

The instruction sending module 34 is configured to send a preset trigger instruction to the terminal with a successfully occupied unlicensed spectrum idle channel resource, such that the terminal determines the target uplink transmission resource in the target transmission resource according to the preset trigger instruction.

Figure 16:
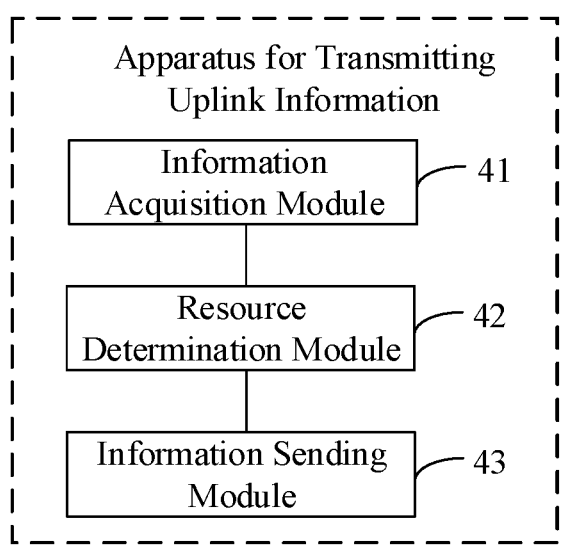
FIG. 16 is a block diagram illustrating another apparatus for transmitting uplink information according to an exemplary embodiment of the disclosure.

Correspondingly; the disclosure further provides an apparatus provided in a terminal of an NR system. Referring to FIG. 16 that is a block diagram illustrating an apparatus for transmitting uplink information according to an exemplary embodiment, the apparatus may include: an information acquisition module 41, a resource determination module 42, and an information sending module 43.

The information acquisition module 41 is configured to acquire uplink transmission configuration information sent by a base station, the uplink transmission configuration information is used to notify the terminal of how to transmit target uplink information with an unlicensed spectrum resource.

The resource determination module 42 is configured to determine a target uplink transmission resource according to the uplink transmission configuration information, the target uplink transmission resource is an unlicensed spectrum resource used for carrying transmission of the target uplink information.

The information sending module 43 is configured to send the target uplink information to the base station with the target uplink transmission resource.

In an apparatus embodiment of the disclosure, the information acquisition module may be configured to acquire the uplink transmission configuration information from a preset information domain of a scheduling instruction sent by the base station.

Figure 17:
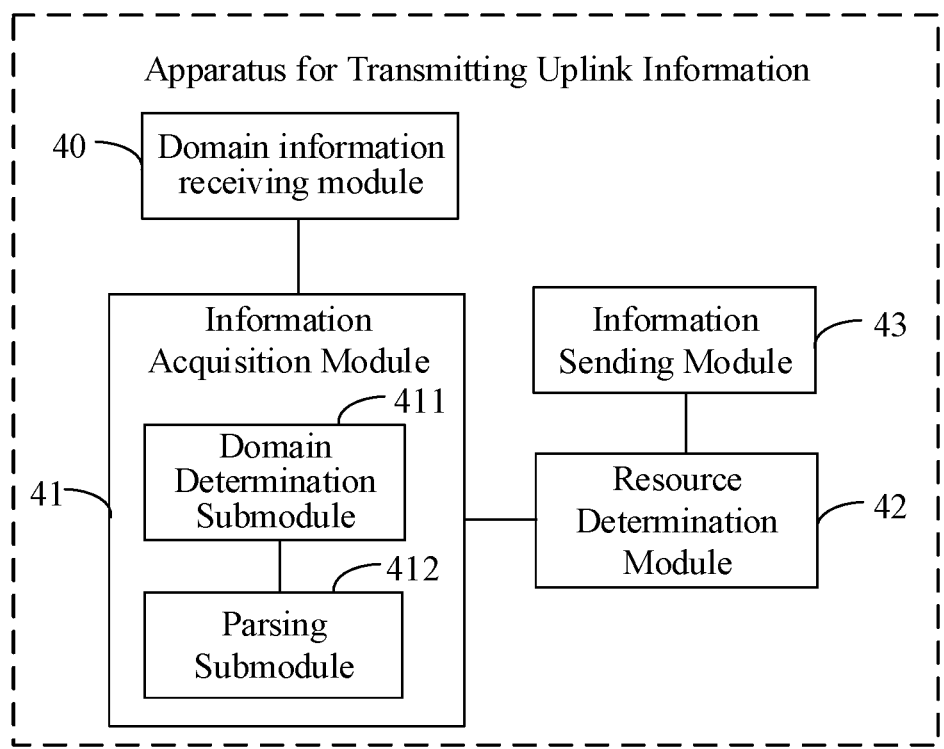
FIG. 17 is a block diagram illustrating another apparatus for transmitting uplink information according to an exemplary embodiment of the disclosure.

Referring to FIG. 17 that is a block diagram illustrating another apparatus for transmitting uplink information according to an exemplary embodiment, on the basis of the apparatus embodiment shown in FIG. 16, the apparatus may further include: a domain information receiving module 40.

The domain information receiving module 40 is configured to receive information domain configuration information sent by the base station.

Correspondingly, the information acquisition module 41 may include: a domain determination submodule 411, and a parsing submodule 412.

The domain determination submodule 411 is configured to determine the preset information domain in the scheduling instruction according to the information domain configuration information.

The parsing submodule 412 is configured to parse the preset information domain to obtain the uplink transmission configuration information.

In an apparatus embodiment of the disclosure, the uplink transmission configuration information acquired by the information acquisition module 41 may at least include: transmission occasion indication information.

Figure 18:
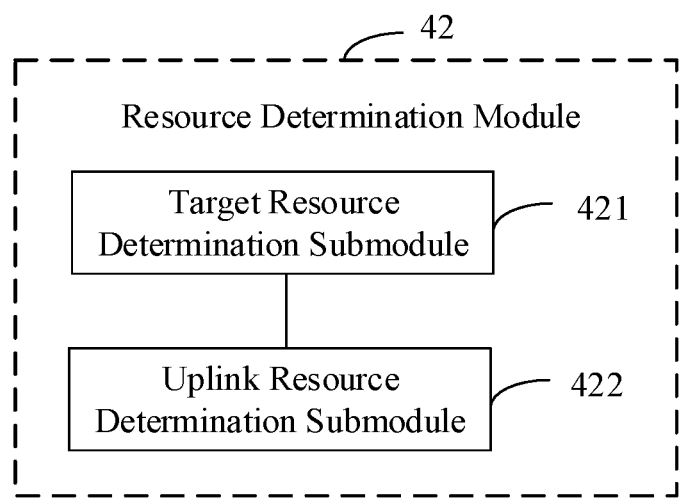
FIG. 18 is a block diagram illustrating another apparatus for transmitting uplink information according to an exemplary embodiment of the disclosure.

Referring to FIG. 18 that is a block diagram illustrating another apparatus for transmitting uplink information according to an exemplary embodiment, on the basis of the apparatus embodiment shown in FIG. 16, the resource determination module 42 may include: a target resource determination submodule 421, and an uplink resource determination submodule 422.

The target resource determination submodule 421 is configured to determine a target transmission resource according to the transmission occasion indication information.

The uplink resource determination submodule 422 is configured to determine the target uplink transmission resource based on the target transmission resource.

In an apparatus embodiment of the disclosure, the transmission occasion indication information may include: first occasion indication information, the first occasion indication information being used to indicate that the terminal transmits the target uplink information with an unlicensed spectrum idle channel resource that is initiated by the base station for occupancy.

Figure 19:
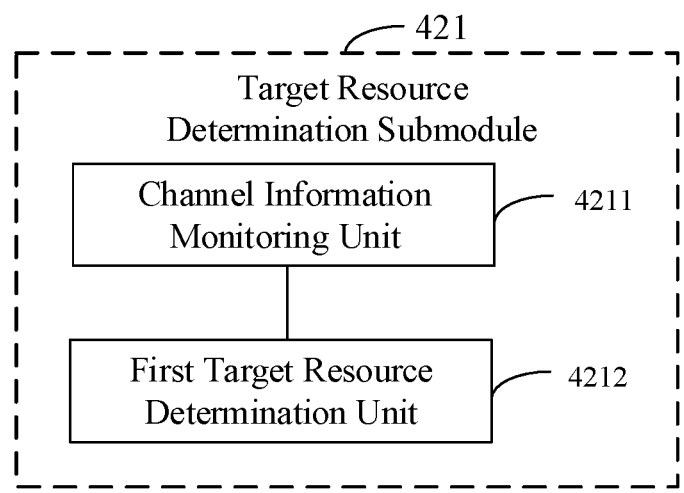
FIG. 19 is a block diagram illustrating another apparatus for transmitting uplink information according to an exemplary embodiment of the disclosure.

Correspondingly, referring to FIG. 19 that is a block diagram illustrating another apparatus for transmitting uplink information according to an exemplary embodiment, on the basis of the apparatus embodiment shown in FIG. 18, the target resource determination module 421 may include:

a channel information monitoring unit 4211, and a first target resource determination unit 4212.

The channel information monitoring unit 4211 is configured to monitor, according to the first occasion indication information, unlicensed spectrum channel occupation information sent by the base station.

The first target resource determination unit 4212 is configured to determine an unlicensed spectrum resource that is subsequently initiated by the base station for occupancy as the target transmission resource.

In an apparatus embodiment of the disclosure, the uplink transmission configuration information may further include: first resource indication information, the first resource indication information is used to notify the terminal of determining the target uplink transmission resource according to a preset trigger instruction sent by the base station.

Figure 20:
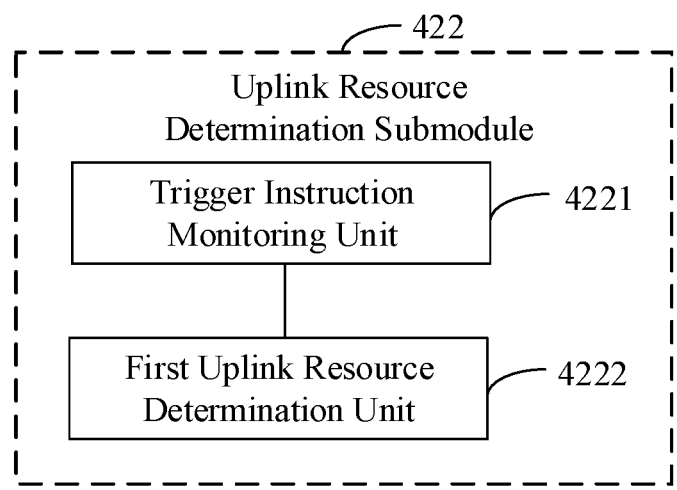
FIG. 20 is a block diagram illustrating another apparatus for transmitting uplink information according to an exemplary embodiment of the disclosure.

Correspondingly, referring to FIG. 20 that is a block diagram illustrating another apparatus for transmitting uplink information according to an exemplary embodiment, on the basis of the apparatus embodiment shown in FIG. 18, the uplink resource determination submodule 422 may include: a trigger instruction monitoring unit 4221, and a first uplink resource determination unit 4222.

The trigger instruction monitoring unit 4221 is configured to monitor, according to the first resource indication information, the preset trigger instruction on the unlicensed spectrum resource that is subsequently initiated by the base station for occupation.

The first uplink resource determination unit 4222 is configured to determine the target uplink transmission resource in the target transmission resource according to the received preset trigger instruction.

In an apparatus embodiment of the disclosure, the preset trigger instruction may be used to indicate a start position of the target uplink transmission resource.

Figure 21:
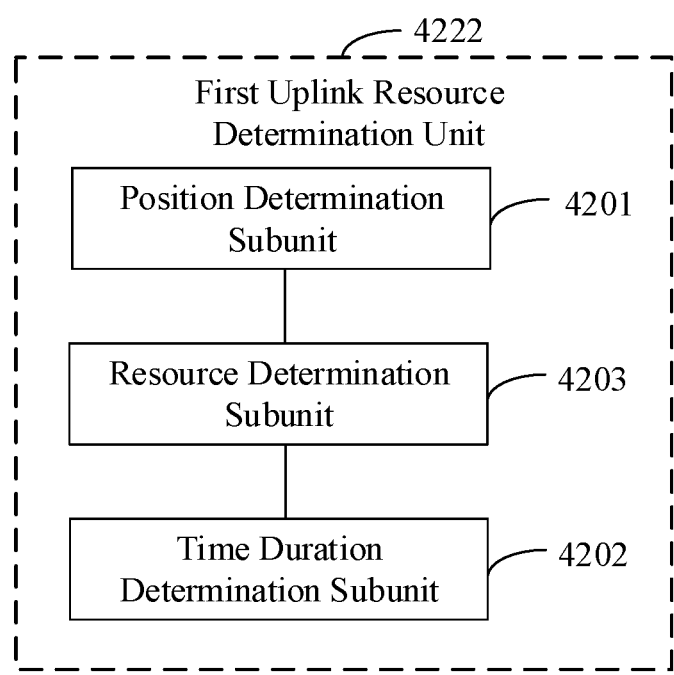
FIG. 21 is a block diagram illustrating another apparatus for transmitting uplink information according to an exemplary embodiment of the disclosure.

Referring to FIG. 21 that is a block diagram illustrating another apparatus for transmitting uplink information according to an exemplary embodiment, on the basis of the apparatus embodiment shown in FIG. 20, the first uplink resource determination unit 4222 may include: a position determination subunit 4201, a time duration determination subunit 4202, and a resource determination subunit 4203.

The position determination subunit 4201 is configured to determine start position information of the target uplink transmission resource according to the preset trigger instruction.

The time duration determination subunit 4202 is configured to determine a time domain range of the target uplink transmission resource according to preset second resource indication information, the preset second resource indication information is used to indicate occupancy time duration of the target uplink transmission resource.

The resource determination subunit 4203 is configured to determine the target uplink transmission resource in the target transmission resource according to the start position information and the occupancy time duration of the target uplink transmission resource.

In another apparatus embodiment of the disclosure, the preset trigger instruction may be used to indicate a time-frequency position of the target uplink transmission resource.

Correspondingly, the first uplink resource determination unit 4222 is configured to determine a time-frequency position of the target uplink transmission resource in the target transmission resource according to the preset trigger instruction.

In another apparatus embodiment of the disclosure, the transmission occasion indication information includes: second occasion indication information: and the second occasion indication information is used to indicate that the terminal transmits the target uplink information with an unlicensed spectrum idle channel resource that is initiated by the terminal itself for occupancy.

Figure 22:
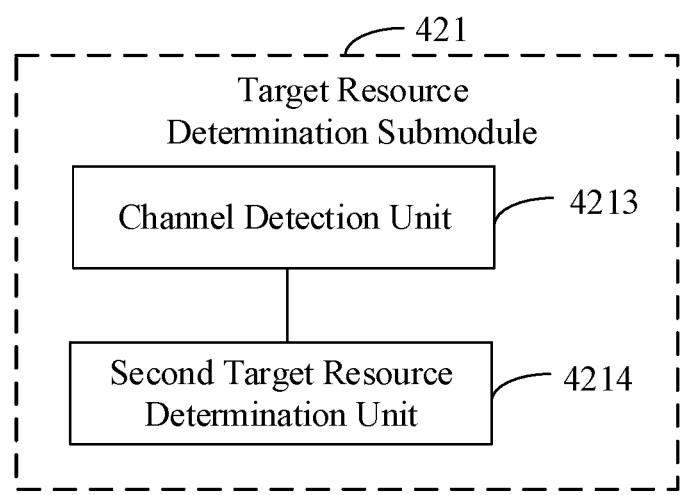
FIG. 22 is a block diagram illustrating another apparatus for transmitting uplink information according to an exemplary embodiment of the disclosure.

Referring to FIG. 22 that is a block diagram illustrating another apparatus for transmitting uplink information according to an exemplary embodiment, on the basis of the apparatus embodiment shown in FIG. 18, the target resource determination submodule 421 may include: a channel detection unit 4213, and a second target resource determination unit 4214.

The channel detection unit 4213 is configured to detect an idle channel resource on an unlicensed spectrum according to the second occasion indication information.

The second target resource determination unit 4214 is configured to determine a successfully occupied unlicensed spectrum idle channel resource as the target transmission resource.

In another embodiment of the disclosure, the uplink transmission configuration information may further include: preset resource detection position information: the preset resource detection position information is used to indicate that the terminal performs unlicensed spectrum idle channel resource detection at a preset resource detection position: and the preset resource detection position information may include: one or more preset resource detection positions.

Correspondingly, the channel detection unit 4213 is configured to detect the unlicensed spectrum idle channel resource at the preset resource detection position.

The uplink resource determination submodule 422 may be configured to determine an unlicensed spectrum idle channel resource detected at the preset resource detection position as the target uplink transmission resource.

In another embodiment of the disclosure, the uplink transmission configuration information may include: third resource indication information, the third resource indication information is used to indicate position information of the target uplink transmission resource in an unlicensed spectrum resource successfully occupied by he terminal.

Correspondingly, the uplink resource determination submodule 422 may be configured to determine the target uplink transmission resource from an occupied unlicensed spectrum idle channel resource according to the third resource indication information.

In another embodiment of the disclosure, the target uplink information may include: at least two pieces of HARQ feedback information respectively corresponding to scheduled downlink data transmission.

Figure 23:
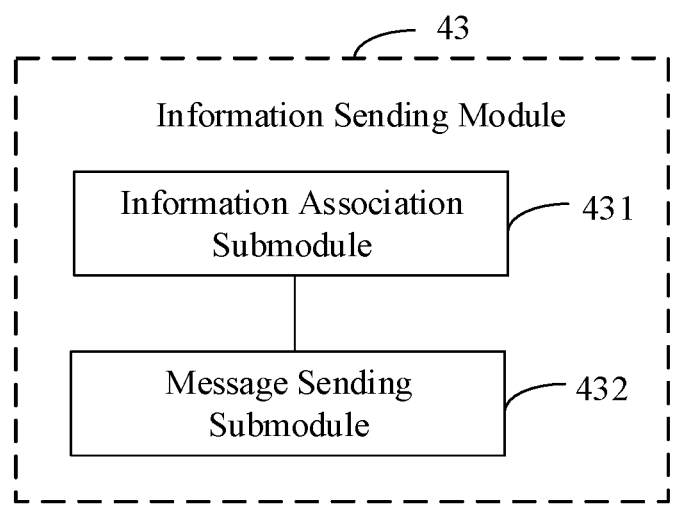
FIG. 23 is a block diagram illustrating another apparatus for transmitting uplink information according to an exemplary embodiment of the disclosure.

Referring to FIG. 23 that is a block diagram illustrating another apparatus for transmitting uplink information according to an exemplary embodiment, on the basis of the apparatus embodiment shown in FIG. 17, the information sending module 43 may include: an information association submodule 431, and a message sending submodule 432.

The information association submodule 431 is configured to associate each piece of HARQ feedback information with transmission identifier information of the respective scheduled downlink data transmission to obtain at least two association messages.

The message sending submodule 432 is configured to send the at least two association messages to the base station with the target uplink transmission resource.

The transmission identifier information of the scheduled downlink data transmission may include at least one of the following items:

preset HARQ identifier information, scheduling signaling information corresponding to the scheduled downlink data transmission, and resource information corresponding to the scheduled downlink data transmission.

The device embodiment is basically corresponding to the method embodiment, so relevant part may be referred to the description in the method embodiment. The above described device embodiment is merely schematic. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the disclosure. Those of ordinary skill in the art may understand and implement the disclosure without creative work.

Correspondingly, according to one aspect, a base station is provided, which may include:

a processor: and a memory, configured to store an instruction executable for the processor.

The processor is configured to:

determine uplink transmission configuration information for target uplink information, the uplink transmission configuration information is used to notify a terminal of how to transmit the target uplink information with an unlicensed spectrum resource: and send the uplink transmission configuration information to the terminal, such that the terminal transmits the target uplink information with the unlicensed spectrum resource according to the uplink transmission configuration information.

According to another aspect, a terminal is provided, which may include:

a processor: and a memory, configured to store an instruction executable for the processor.

The processor is configured to:

acquire uplink transmission configuration information sent by a base station, the uplink transmission configuration information is used to notify the terminal of how to transmit target uplink information with an unlicensed spectrum resource;

determine a target uplink transmission resource according to the uplink transmission configuration information, the target uplink transmission resource is an unlicensed spectrum resource used for carrying transmission of the target uplink information: and send the target uplink information to the base station with the target uplink transmission resource.

Figure 24:
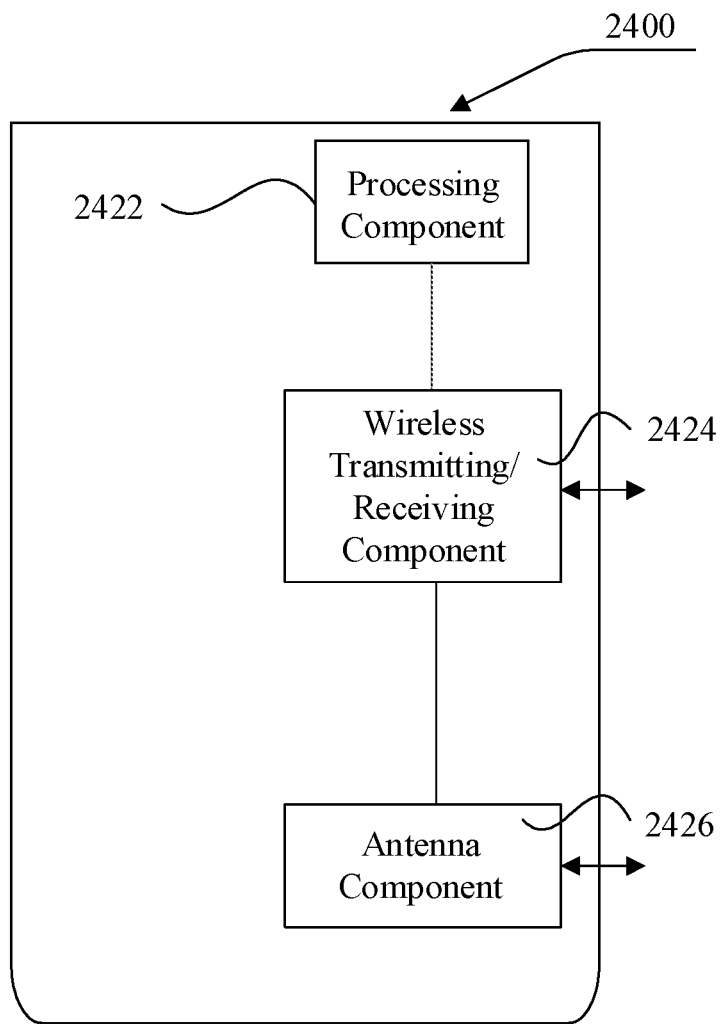
FIG. 24 is a structural schematic diagram illustrating a base station according to an exemplary embodiment of the disclosure.

As shown in FIG. 24, FIG. 24 is a structural schematic diagram illustrating a base station 2400 according to an exemplary embodiment. Referring to FIG. 24, the base station 2400 includes a processing component 2422, a wireless transmitting/receiving component 2424, an antenna component 2424, and a signal processing portion special for a wireless interface. The processing component 2422 may further include one or more processors.

One processor in the processing component 2422 may be configured to:

determine uplink transmission configuration information for target uplink information, the uplink transmission configuration information is used to notify a terminal of how to transmit the target uplink information with an unlicensed spectrum resource: and send the uplink transmission configuration information to the terminal, such that the terminal transmits the target uplink information with the unlicensed spectrum resource according to the uplink transmission configuration information.

In an exemplary embodiment, a non-temporary computer-readable storage medium including an instruction is further provided, which stores a computer instruction thereon; and the computer instruction may be executed by the processing component 2422 of the base station 2400 to complete the method for transmitting the uplink information shown in FIG. 1 to FIG. 3. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Figure 25:
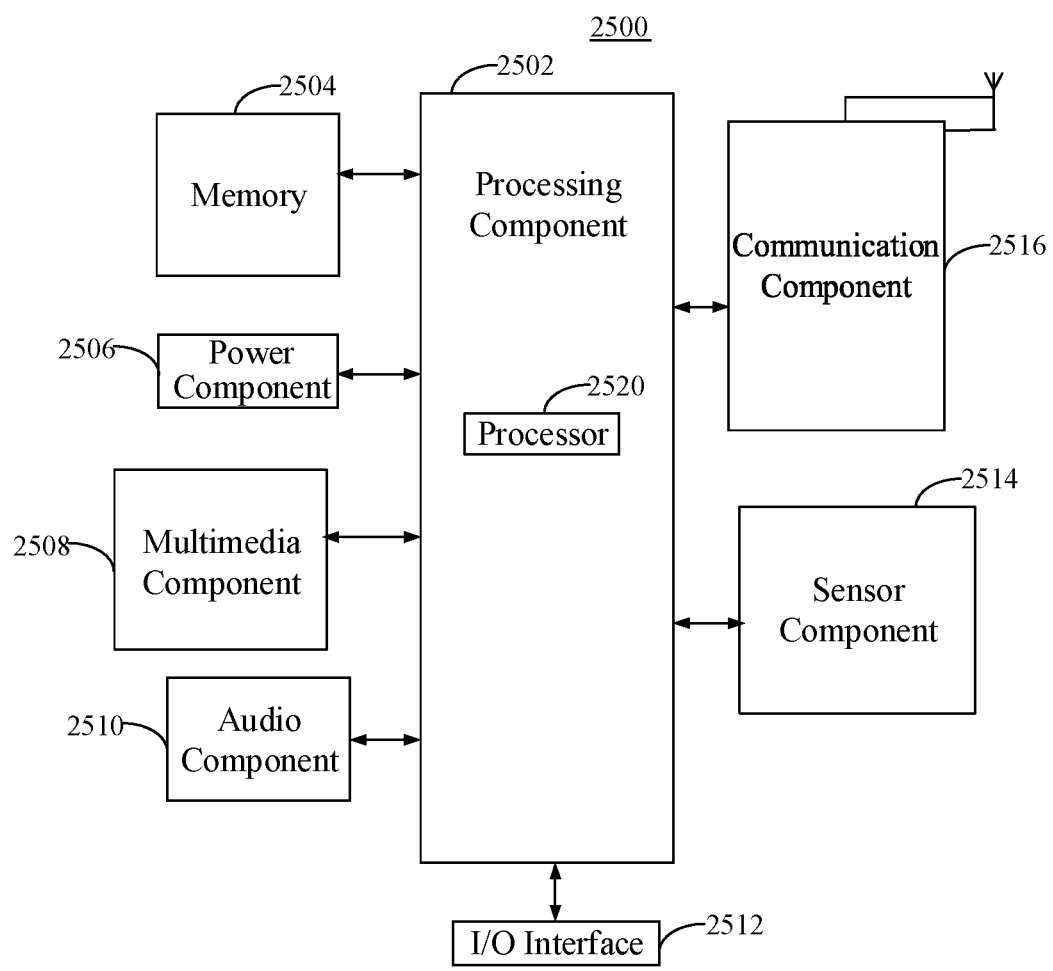
FIG. 25 is a structural schematic diagram illustrating a terminal according to an exemplary embodiment of the disclosure.

FIG. 25 is a structural schematic diagram illustrating a UE 2500 according to an exemplary embodiment. For example, the UE 2500 may be a terminal, and may specifically be a mobile phone, a computer, a digital broadcast terminal, a messaging device, a gaming console, a tablet, a medical device, exercise equipment, a Personal Digital Assistant (PDA), a wearable device such as a smartwatch, smart glasses, a smart bracelet, smart running shoes, and the like.

Referring to FIG. 25, the terminal 2500 may include one or more of the following components: a processing component 2502, a memory 2504, a power component 2506, a multimedia component 2508, an audio component 2510, an Input/Output (I/O) interface 2512, a sensor component 2514, and a communication component 2516.

The processing component 2502 typically controls overall operations of the terminal 2500, such as the operations associated with display, telephone calls, data communications, camera operations, and recording operations. The processing component 2502 may include one or more processors 2520 to execute instructions to perform all or part of the operations in the above described methods. Moreover, the processing component 2502 may include one or more modules which facilitate the interaction between the processing component 2502 and other components. For instance, the processing component 2502 may include a multimedia module to facilitate the interaction between the multimedia component 2508 and the processing component 2502.

The memory 2504 is configured to store various types of data to support the operation of the terminal 2500. Examples of such data include instructions for any application or method operated on the terminal 2500, contact data, phonebook data, messages, pictures, videos, etc. The memory 2504 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory; a flash memory, a magnetic or optical disk.

The power component 2506 provides power to various components of the terminal 2500. The power component 2506 may include a power management system, one or more power sources, and any other components associated with the generation, management, and distribution of power in the terminal 2500.

The multimedia component 2508 includes a screen providing an output interface between the terminal 2500 and the user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 2508 includes a front camera and/or a rear camera. The front camera and/or the rear camera may receive external multimedia data when the apparatus 2500 is in an operation mode, such as a photographing mode or a video mode. Each of the front camera and the rear camera may be a fixed optical lens system or have focus and optical zoom capability.

The audio component 2510 is configured to output and/or input audio signals. For example, the audio component 2510 includes a Microphone (MIC) configured to receive an external audio signal when the terminal 2500 is in an operation mode, such as a call mode, a recording mode, and a voice recognition mode. The received audio signal may further be stored in the memory 2504 or transmitted via the communication component 2516. In some embodiments, the audio component 2510 further includes a speaker configured to output audio signals.

The I/O interface 2512 provides an interface between the processing component 2502 and peripheral interface modules. The peripheral interface modules may be a keyboard, a click wheel, buttons, and the like. The buttons may include, but are not limited to, a home button, a volume button, a starting button, and a locking button.

The sensor component 2514 includes one or more sensors to provide status assessments of various aspects of the terminal 2500. For instance, the sensor component 2514 may detect an open/closed status of the device 2500 and relative positioning of components, such as the display and the keypad of the terminal 2500, and the sensor component 2514 may further detect a change in position of the terminal 2500 or a component of the terminal 2500, a presence or absence of user contact with the terminal 2500, an orientation or an acceleration/deceleration of the terminal 2500, and a change in temperature of the terminal 2500. The sensor component 2514 may include a proximity sensor, configured to detect the presence of nearby objects without any physical contact. The sensor component 2514 may also include a light sensor, such as a Complementary Metal Oxide Semiconductor (CMOS) or Charge Coupled Device (CCD) image sensor, for use in imaging applications. In some embodiments, the sensor component 2514 may also include an accelerometer sensor, a gyroscope sensor, a magnetic sensor, a pressure sensor, or a temperature sensor.

The communication component 2516 is configured to facilitate communication, wired or wirelessly, between the terminal 2500 and other devices. The terminal 2500 may access a wireless network based on a communication standard, such as WiFi, 2G, 3G, 4G LTE, 5G NR or a combination thereof. In one exemplary embodiment, the communication component 2516 receives a broadcast signal or broadcast associated information from an external broadcast management system via a broadcast channel. In an exemplary embodiment, the communication component 2516 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In an exemplary embodiment, the terminal 2500 may be implemented with one or more Application Specific Integrated Circuits (ASIC), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In an exemplary embodiment, a non-temporary computer readable storage medium including an instruction is further provided, for example, the memory 2504 including the instruction: and the instruction may be executed by the processor 2520 of the terminal 2500 to complete the method for transmitting the uplink information shown in FIG. 5 to FIG. 12. For example, the non-transitory computer-readable storage medium may be an ROM, an RAM, a CD-ROM, a magnetic tape, a floppy disc, an optical data storage device and the like.

The technical solutions provided by the embodiments of the disclosure may have the following beneficial effects.

When determining that the terminal has target uplink information to be sent, the base station may notify, through uplink transmission configuration information, the terminal of how to determine a target uplink transmission resource on an unlicensed spectrum, and then the target uplink information is timely sent to the base station with the target uplink transmission resource, thereby reducing the transmission latency of the uplink information due to a channel occupation uncertainty of the unlicensed spectrum and limited channel occupancy time duration, and improving the user experience that the terminal transmits the uplink information with the unlicensed spectrum resource in the 5G NR system.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for transmitting uplink information, comprising:
   determining, by a base station, uplink transmission configuration information for target uplink information, the uplink transmission configuration information being used to notify a terminal of how to transmit the target uplink information with an unlicensed spectrum resource;
   determining, by the base station, information domain configuration information, wherein the information domain configuration information is used to notify the terminal of configuration information of a preset information domain;
   sending, by the base station, the information domain configuration information to the terminal; and sending, by the base station, a scheduling instruction to the terminal, wherein the scheduling instruction comprises the preset information domain into which the uplink transmission configuration information is loaded, such that the terminal obtains the uplink transmission configuration information by parsing the preset information domain and transmits the target uplink information with the unlicensed spectrum resource according to the uplink transmission configuration information.

2. The method of claim 1, wherein the uplink transmission configuration information at least comprises transmission occasion indication information,
   wherein the transmission occasion indication information is used to indicate that the terminal determines a target transmission resource, the target transmission resource comprises a target uplink transmission resource, the target uplink transmission resource is an unlicensed spectrum resource used for carrying transmission of the target uplink information,
   wherein the transmission occasion indication information comprises first occasion indication information, the first occasion indication information is used to indicate that the terminal transmits the target uplink information with an unlicensed spectrum resource initiated by the base station for occupancy, or
   wherein the transmission occasion indication information comprises second occasion indication information, the second occasion indication information is used to indicate that the terminal transmits the target uplink information with an unlicensed spectrum resource that is initiated by the terminal itself for occupancy.

3. The method of claim 2, wherein the uplink transmission configuration information further comprises resource indication information, the resource indication information is used to indicate that the terminal determines the target uplink transmission resource based on the target transmission resource.

4. The method of claim 3, wherein the resource indication information is used to notify the terminal of determining the target uplink transmission resource in the target transmission resource according to a preset trigger instruction sent by the base station.

5. The method of claim 3, wherein the resource indication information comprises: uplink resource position indication information, the uplink resource position indication information is used to indicate that the terminal performs idle channel resource detection at a preset resource detection position, and transmits the target uplink information with an unlicensed spectrum idle channel resource at the preset resource detection position after the idle channel resource detection is successful.

6. The method of claim 2, further comprises:
   detecting an unlicensed spectrum idle channel resource; and
   sending a preset trigger instruction to the terminal with a successfully occupied unlicensed spectrum idle channel resource, such that the terminal determines the target uplink transmission resource in the target transmission resource according to the preset trigger instruction.

7. The method of claim 1, wherein
   the information domain configuration information comprises at least one of following parameters: position of the preset information domain, length of the preset information domain, or preset evaluation indication of the preset information domain.

8. A base station, comprising:
   a processor; and
   a memory, configured to store an instruction executable for the processor,
   wherein the processor is configured to perform the method of claim 1.

9. A method for transmitting uplink information, comprising:
   receiving, by a terminal, information domain configuration information sent by a base station;
   determining, by the terminal and according to the information domain configuration information, a preset information domain in a scheduling instruction sent by the base station;
   parsing, by the terminal, the preset information domain to obtain uplink transmission configuration information, wherein the uplink transmission configuration information is used to notify the terminal of how to transmit target uplink information with an unlicensed spectrum resource;
   determining, by the terminal and according to the uplink transmission configuration information, a target uplink transmission resource, the target uplink transmission resource being an unlicensed spectrum resource used for carrying transmission of the target uplink information; and
   sending, by the terminal, the target uplink information to the base station with the target uplink transmission resource.

10. The method of claim 9, wherein the uplink transmission configuration information at least comprises: transmission occasion indication information,
    wherein determining the target uplink transmission resource according to the uplink transmission configuration information comprises:
    determining, according to the transmission occasion indication information, a target transmission resource; and
    determining the target uplink transmission resource based on the target transmission resource.

11. The method of claim 10, wherein the transmission occasion indication information comprises first occasion indication information, the first occasion indication information is used to indicate that the terminal transmits the target uplink information with an unlicensed spectrum idle channel resource initiated by the base station for occupancy,
    and wherein determining, according to the transmission occasion indication information, the target transmission resource comprises:
    monitoring, according to the first occasion indication information, unlicensed spectrum channel occupation information sent by the base station; and
    determining an unlicensed spectrum resource subsequently initiated by the base station for occupancy as the target transmission resource.

12. The method of claim 11, wherein the uplink transmission configuration information further comprises first resource indication information, the first resource indication information is used to notify the terminal of determining the target uplink transmission resource according to a preset trigger instruction sent by the base station,
    and wherein determining the target uplink transmission resource based on the target transmission resource comprises:
    monitoring, according to the first resource indication information, the preset trigger instruction on the unlicensed spectrum resource subsequently initiated by the base station for occupancy; and determining, according to the preset trigger instruction which is monitored, the target uplink transmission resource in the target transmission resource.

13. The method of claim 12, wherein the preset trigger instruction is used to indicate a start position of the target uplink transmission resource,
and wherein determining, according to the preset trigger instruction which is monitored, the target uplink transmission resource in the target transmission resource comprises:
determining, according to the preset trigger instruction, start position information of the target uplink transmission resource;
determining, according to preset second resource indication information, a time domain range of the target uplink transmission resource, the preset second resource indication information is used to indicate occupancy time duration of the target uplink transmission resource; and
determining, according to the start position information and the occupancy time duration of the target uplink transmission resource, the target uplink transmission resource in the target transmission resource.

14. The method of claim 12, wherein the preset trigger instruction is used to indicate a time-frequency position of the target uplink transmission resource,
and wherein determining the target uplink transmission resource in the target transmission resource according to the preset trigger instruction which is monitored comprises:
determining, according to the preset trigger instruction, a time-frequency position of the target uplink transmission resource in the target transmission resource.

15. The method of claim 10, wherein the transmission occasion indication information comprises second occasion indication information,
the second occasion indication information is used to indicate that the terminal transmits the target uplink information with an unlicensed spectrum idle channel resource initiated by the terminal itself for occupancy,
wherein determining the target transmission resource according to the transmission occasion indication information comprises:
detecting, according to the second occasion indication information, an idle channel resource on an unlicensed spectrum; and
determining a successfully occupied unlicensed spectrum idle channel resource as the target transmission resource.

16. The method of claim 15, wherein the uplink transmission configuration information further comprises preset resource detection position information, the preset resource detection position information is used to indicate that the terminal performs unlicensed spectrum idle channel resource detection at a preset resource detection position, and the preset resource detection position information comprises: one or more preset resource detection positions,
wherein detecting the idle channel resource on the unlicensed spectrum comprises:
detecting the unlicensed spectrum idle channel resource at the preset resource detection position, and
wherein determining the target uplink transmission resource based on the target transmission resource comprises:
determining an unlicensed spectrum idle channel resource detected at the preset resource detection position as the target uplink transmission resource.

17. The method of claim 15, wherein the uplink transmission configuration information comprises third resource indication information, the third resource indication information is used to indicate position information of the target uplink transmission resource in unlicensed spectrum resources successfully occupied by the terminal,
wherein determining the target uplink transmission resource based on the target transmission resource comprises:
determining, according to the third resource indication information, the target uplink transmission resource from occupied unlicensed spectrum idle channel resources.

18. The method of claim 9, wherein the target uplink information comprises: at least two pieces of Hybrid Automatic Repeat reQuest (HARQ) feedback information respectively corresponding to scheduled downlink data transmission, and wherein sending the target uplink information to the base station with the target uplink transmission resource comprises:
associating each piece of the HARQ feedback information with transmission identifier information of respective scheduled downlink data transmission to obtain at least two association messages; and
sending the at least two association messages to the base station with the target uplink transmission resource,
wherein the transmission identifier information of the scheduled downlink data transmission comprises at least one of following parameters:
preset HARQ identifier, scheduling signaling corresponding to the scheduled downlink data transmission, or resource information corresponding to the scheduled downlink data transmission.

19. A terminal, comprising:
a processor; and
a memory, configured to store an instruction executable for the processor,
wherein the processor is configured to:
receive information domain configuration information sent by a base station;
determine a preset information domain in a scheduling instruction sent by the base station, according to the information domain configuration information;
parse the preset information domain to obtain uplink transmission configuration information, wherein the uplink transmission configuration information is used to notify the terminal of how to transmit target uplink information with an unlicensed spectrum resource;
determine a target uplink transmission resource according to the uplink transmission configuration information, the target uplink transmission resource is an unlicensed spectrum resource used for carrying transmission of the target uplink information; and
send the target uplink information to the base station with the target uplink transmission resource.

* * * * *